United States Patent
Eom et al.

(10) Patent No.: US 9,246,863 B2
(45) Date of Patent: Jan. 26, 2016

(54) METHOD FOR TRANSFERRING SESSION IN CONVERGED INTERNET PROTOCOL MESSAGING SYSTEM

(75) Inventors: Hyeonsang Eom, Seoul (KR); Seung-Yong Lee, Seoul (KR); Sung-Jin Park, Suwon-si (KR); Kyung-Tak Lee, Yongin-si (KR)

(73) Assignees: Samsung Electronics Co., Ltd (KR); Seoul National University Industry Foundation (KR)

( * ) Notice: Subject to any disclaimer, the term of this patent is extended or adjusted under 35 U.S.C. 154(b) by 874 days.

(21) Appl. No.: 12/709,992

(22) Filed: Feb. 22, 2010

(65) Prior Publication Data

US 2010/0215036 A1 Aug. 26, 2010

(30) Foreign Application Priority Data

Feb. 20, 2009 (KR) .................. 10-2009-0014512

(51) Int. Cl.
*H04L 12/66* (2006.01)
*H04L 12/58* (2006.01)
(Continued)

(52) U.S. Cl.
CPC .............. *H04L 51/22* (2013.01); *H04L 51/36* (2013.01); *H04L 65/1083* (2013.01); *H04M 3/58* (2013.01); *H04M 7/006* (2013.01)

(58) Field of Classification Search
CPC .............. H04L 12/581; H04L 12/5835; H04L 12/5895; H04L 51/04; H04L 51/066; H04L 65/1086; H04L 65/1096; H04L 29/08639; H04L 29/08603; H04L 67/148; H04L 67/143; H04L 67/14; H04M 3/58

USPC .......... 370/259–263, 310–338, 227; 455/466, 455/412.1, 445, 557, 227.1; 709/206, 709/217–227, 203; 379/93.09, 93.11, 379/142.07
See application file for complete search history.

(56) References Cited

U.S. PATENT DOCUMENTS 6,405,035 B1 * 6/2002 Singh .................. 455/414.1
6,980,802 B2 12/2005 Jung
(Continued)

FOREIGN PATENT DOCUMENTS

KR  1020060067309  6/2006
KR  1020060081964  7/2006
(Continued)

OTHER PUBLICATIONS

Open Mobile Alliance, "Converged IP Messaging", Work Item Document, Doc# OMA-WID_0135-CPM-V1_0-20060510-A, May 2005.
(Continued)

*Primary Examiner* — Wutchung Chu
(74) *Attorney, Agent, or Firm* — The Farrell Law Firm, P.C.

(57) ABSTRACT

A method is provided for transferring a session between multiple devices by a target device, in which the target device selects a particular session of a source device and sends a request for session transfer for the selected session to a call server, the target device acquires from the call server data that has been transmitted from the remote party's device of the particular session and temporarily stored in the call server after the session transfer request, and the target device sends a message indicating completed acquisition of the temporarily stored data to the call server, and receives the particular session transferred in response thereto.

14 Claims, 16 Drawing Sheets

(51) Int. Cl.
*H04L 29/06* (2006.01)
*H04M 3/58* (2006.01)
*H04M 7/00* (2006.01)

(56) References Cited

U.S. PATENT DOCUMENTS

| | | | |
|---|---|---|---|
| 7,099,946 B2 | 8/2006 | Lennon et al. | |
| 7,191,233 B2* | 3/2007 | Miller | 709/227 |
| 7,356,567 B2* | 4/2008 | Odell et al. | 709/206 |
| 7,444,423 B2* | 10/2008 | Shahi et al. | 709/238 |
| 7,624,185 B2* | 11/2009 | Miller | 709/227 |
| 7,949,763 B2* | 5/2011 | Yagi | 709/227 |
| 7,978,216 B2* | 7/2011 | Asthana et al. | 348/14.09 |
| 8,010,611 B2* | 8/2011 | Wang et al. | 709/206 |
| 8,032,589 B2* | 10/2011 | Foti | 709/203 |
| 2002/0161896 A1* | 10/2002 | Wen et al. | 709/227 |
| 2003/0055977 A1* | 3/2003 | Miller | H04L 29/06 709/227 |
| 2003/0088676 A1* | 5/2003 | Smith et al. | 709/227 |
| 2003/0101343 A1* | 5/2003 | Eaton et al. | 713/170 |
| 2004/0068567 A1* | 4/2004 | Moran et al. | 709/227 |
| 2005/0015765 A1* | 1/2005 | Covell et al. | 718/100 |
| 2005/0033843 A1* | 2/2005 | Shahi | G06F 17/30899 709/226 |
| 2005/0059384 A1* | 3/2005 | Kuusinen et al. | 455/414.1 |
| 2005/0132009 A1* | 6/2005 | Solie | H04L 12/1831 709/206 |
| 2005/0138128 A1 | 6/2005 | Baniel et al. | |
| 2006/0018272 A1* | 1/2006 | Mutikainen et al. | 370/328 |
| 2006/0126648 A1 | 6/2006 | Park et al. | |
| 2006/0172753 A1 | 8/2006 | Sung et al. | |
| 2006/0212518 A1* | 9/2006 | Bailey et al. | 709/205 |
| 2007/0050510 A1* | 3/2007 | Jiang | 709/227 |
| 2007/0094490 A1* | 4/2007 | Lohr | H04L 67/14 713/153 |
| 2007/0100952 A1* | 5/2007 | Chen et al. | 709/207 |
| 2007/0162605 A1* | 7/2007 | Chalasani et al. | 709/227 |
| 2007/0183325 A1* | 8/2007 | Tamura | 370/230 |
| 2008/0032695 A1* | 2/2008 | Zhu et al. | 455/442 |
| 2008/0043971 A1* | 2/2008 | Barchi | 379/212.01 |
| 2008/0114881 A1 | 5/2008 | Lee et al. | |
| 2008/0123686 A1 | 5/2008 | Lee et al. | |
| 2008/0310611 A1* | 12/2008 | Moriwaki et al. | 379/212.01 |
| 2008/0313284 A1* | 12/2008 | Doyle | 709/206 |
| 2009/0017856 A1* | 1/2009 | Albertsson et al. | 455/518 |
| 2009/0150562 A1* | 6/2009 | Kim et al. | 709/238 |
| 2009/0210536 A1* | 8/2009 | Allen et al. | 709/227 |
| 2009/0279455 A1* | 11/2009 | Wang et al. | 370/260 |
| 2009/0284579 A1* | 11/2009 | Knaz | 348/14.02 |
| 2009/0327247 A1* | 12/2009 | Jia et al. | 707/3 |
| 2010/0042729 A1* | 2/2010 | Miller | 709/227 |
| 2010/0157882 A1* | 6/2010 | Moriwaki et al. | 370/328 |
| 2011/0150203 A1* | 6/2011 | Stille et al. | 379/207.16 |
| 2011/0195691 A9* | 8/2011 | Maguire et al. | 455/412.1 |
| 2011/0314134 A1* | 12/2011 | Foti | 709/219 |
| 2012/0066326 A1* | 3/2012 | Soderstrom et al. | 709/206 |

FOREIGN PATENT DOCUMENTS

| | | |
|---|---|---|
| KR | 1020070067927 | 6/2007 |
| KR | 1020080043103 | 5/2008 |
| WO | WO 2006/045323 | 5/2006 |

OTHER PUBLICATIONS

Open Mobile Alliance, "Converged IP Messaging Requirements", Approved Version 1.0, OMA-RD-CPM-V1_0-20120612-A, May 2005.

Open Mobile Alliance, "Converged IP Messaging Architecture", Approved Version 1.0, OMA-AD-CPM-V1_0-20120612-A, Mar. 2008.

J. Rosenberg et al., Request for Comments 3261, "SIP: Session Initiation Protocol," Jun. 2002.

B. Campbell et al., Request for Comments 4975, "The Message Session Relay Protocol (MSRP)," Sep. 2007.

M. Crispin, Request for Comments 3501, "Internet Message Access Protocol—Version 4rev1," Mar. 2003.

James Yu et al., "Editorial Comments to CPM RD", OMA-RD-CPM-V1_0-20070828-D, Change Request, Sep. 9, 2007.

Open Mobile Alliance, Attachment to Change Request, Sep. 9, 2007.

Korean Office Action dated Dec. 18, 2014 issued in counterpart application No. 10-2009-0014512.

Korean Office Action dated Jun. 25, 2015 issued in counterpart application No. 10-2009-0014512, 9 pages.

* cited by examiner

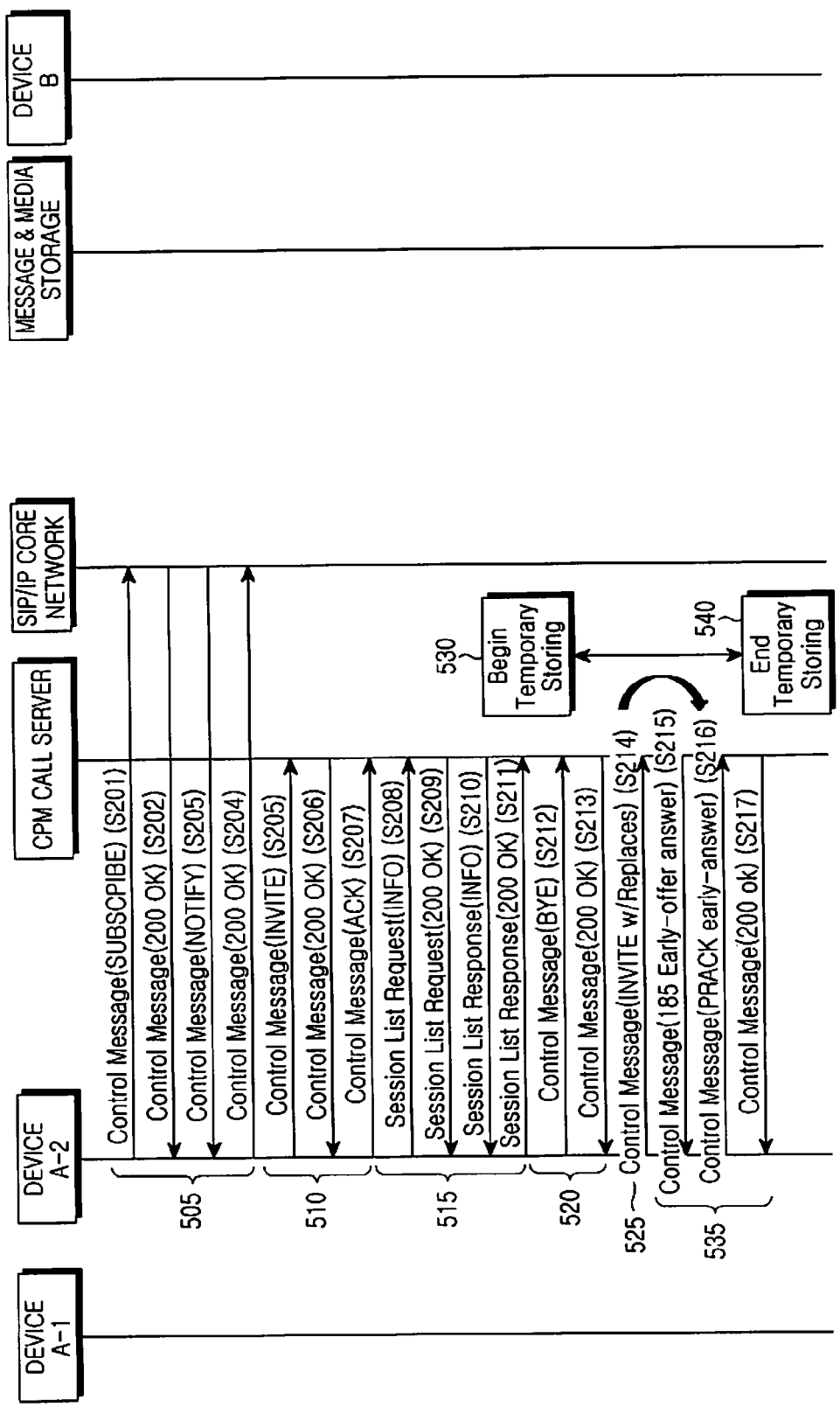

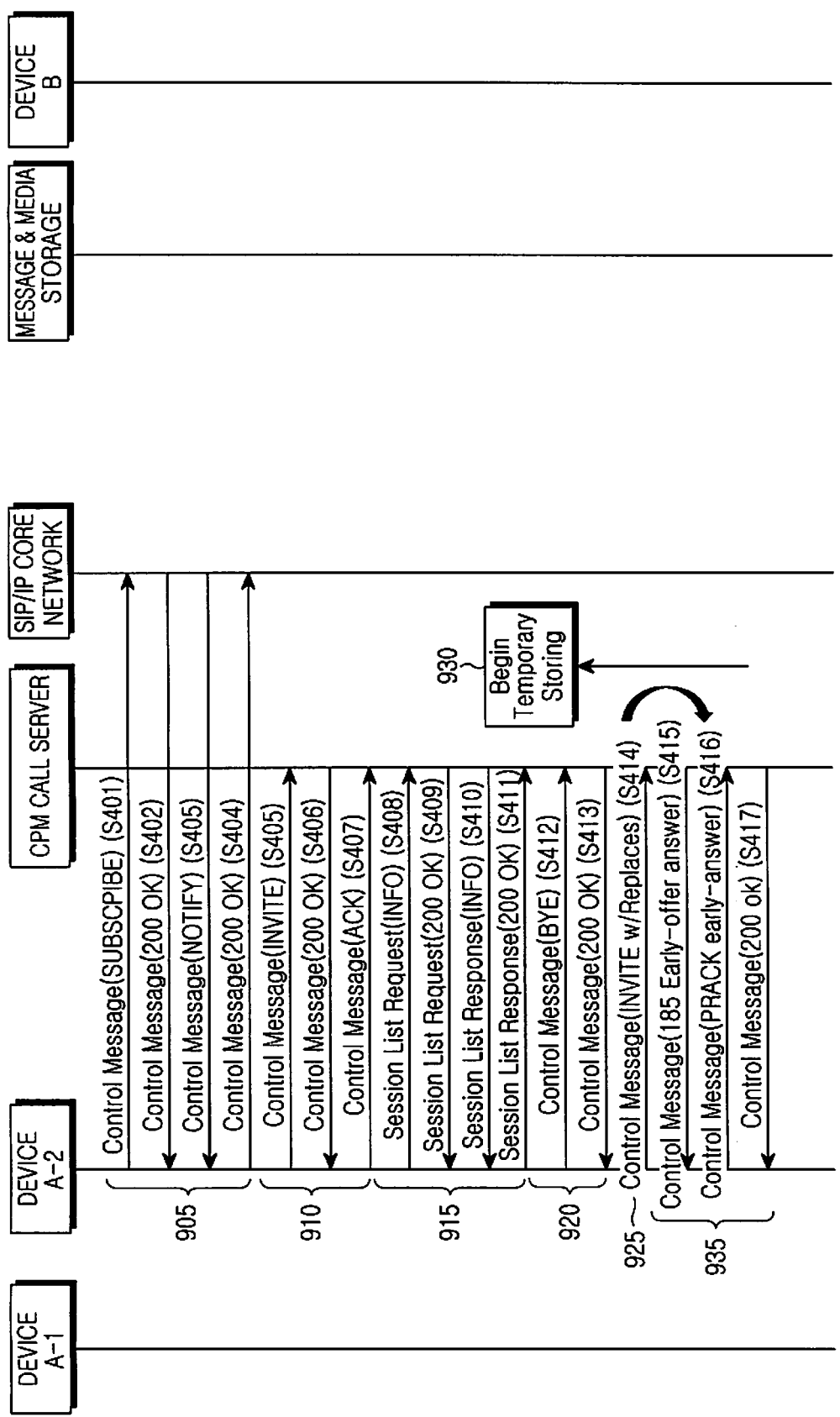

METHOD FOR TRANSFERRING SESSION IN CONVERGED INTERNET PROTOCOL MESSAGING SYSTEM

PRIORITY

This application claims priority under 35 U.S.C. §119(a) to a Korean Patent Application filed in the Korean Intellectual Property Office on Feb. 20, 2009 and assigned Serial No. 10-2009-0014512, the entire contents of which are incorporated herein by reference.

BACKGROUND OF THE INVENTION

1. Field of the Invention

The present invention relates to session transfer in a Converged Internet Protocol Messaging (CPM) System, and more particularly, to session transfer between devices based on temporary storage in a CPM system.

2. Description of the Related Art

In the existing mobile environment, terminals send intermittent messages such as Short Messaging Service (SMS) messages and Multimedia Messaging Service (MMS) messages. However, many users increasingly expect new messaging services in which they can easily have a dialog using the messenger application in the wired environment. Hence, an Instant Messaging (IM) service has been introduced in terminals and networks based on a Session Initiation Protocol/Internet Protocol (SIP/IP) Core network. Moreover, a Push to talk over Cellular (PoC) service and system based on the SIP/IP Core network has been developed to meet the needs of customers and businesses for Push To Talk (i.e., walkie-talkie). Along with the rapid change in the communication industry, many users increasingly desire to handle different types of received messages in an integrated manner.

Considering these facts, Open Mobile Alliance (OMA), a standards organization, which establishes international private standards of mobile solutions and services, is currently developing standard technologies for Converged IP Messaging (CPM) implemented based on the SIP/IP Core network.

The CPM service is an IP Multimedia Subsystem (IMS)-based messaging service, and its concept provides the existing SMS and MMS services based on the Internet Protocol (IP) in an integrated manner. While the current messaging service enables transmission/reception only in limited networks and terminals, CPM may provide IP-based united messaging services regardless of the terminal type, media type (i.e., content of the message), network type and service type.

One of the many features of the CPM service is that users can access the messaging service using many different devices simultaneously. For example, one user may be provided with the service by using a device A-1 and a device A-2 at the same time. If the user is initially communicating with remote device B (remote user) using device A-1 but desires to continue communication using device A-2 while he is connected to the remote device B, the session that was connected through device A-1 (source device) needs to be transferred to device A-2 (target device). The described procedure is called "session transfer."

In order to maintain a high quality of communication services during the session transfer, a detailed operational procedure for seamless session transfer is required so that neither the source user nor the remote user are aware of the session transfer.

BRIEF SUMMARY OF THE INVENTION

An aspect of the present invention addresses at least the above-mentioned problems and/or disadvantages and to provide at least the advantages described below. Accordingly, an aspect of the present invention provides a method for seamless session transfer in communications sessions using a CPM service.

Another aspect of the present invention provides a target device-initiated seamless session transfer method in a CPM service.

Another aspect of the present invention provides a message format used for target device-initiated transparent session transfer in communications sessions using CPM service.

In accordance with another aspect of the present invention, a method is provided for transferring a session between multiple devices by a target device, in which the target device selects a particular session of a source device and sends a request for session transfer for the selected particular session to a call server, the target device then acquires, from the call server, data that has been transmitted from the remote device of the particular session and temporarily stored in the call server after the session transfer request, and the target device sends a message indicating completed acquisition of the temporarily stored data to the call server, and receives the particular session transferred in response thereto.

In accordance with another aspect of the present invention, a method is provided for acquiring a session list by a target device for session transfer between multiple devices, in which the target device acquires a device list by sending a request for the device list to a network, requests a call server to generate a separate session for acquiring a session list of a source device included in the acquired device list, acquires the session list through the generated separate session, and closes the generated separate session.

In accordance with a another aspect of the present invention, a method is provided for transferring a session between multiple devices in a call server, in which the call server begins temporarily storing data transmitted from the remote device of a particular session upon receiving a request for session transfer for the particular session of a source device from a target device, and generates a separate session with the target device for transmission of the temporarily stored data, and if the generation of the separate session is completed, the call server ends the temporary storage of data and transmits the temporarily stored data to the target device through the separate session, and the call server transfers the particular session to the target device upon receiving a message indicating completed reception of the temporarily stored data from the target device.

In accordance with yet another aspect of the present invention, a method is provided for transmitting a session list by a call server for session transfer between multiple devices connected to the call server, in which the call server generates a requested separate session upon receiving a request for such separate session for transmission of a session list of a source device from a target device, and upon receiving a request for transmission of the session list from the target device, the call server transmits the session list of the source device to the target device through the generated separate session.

BRIEF DESCRIPTION OF THE DRAWINGS

The above and other aspects, features and advantages of certain embodiments of the present invention will be more apparent from the following description taken in conjunction with the accompanying drawings, in which:

FIGS. 5A and 5B are diagrams showing a call flow in a CPM system according to a second embodiment of the present invention;

FIGS. 9A and 9B are diagrams showing a call flow in a CPM system according to a fourth embodiment of the present invention.

Throughout the drawings, the same drawing reference numerals will be understood to refer to the same elements, features and structures.

DETAILED DESCRIPTION OF THE INVENTION

The following description, with reference to the accompanying drawings, is provided to assist in a comprehensive understanding of the embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

A configuration of a CPM system, to which the present invention is applicable, will first be described in brief.

Figure 1:
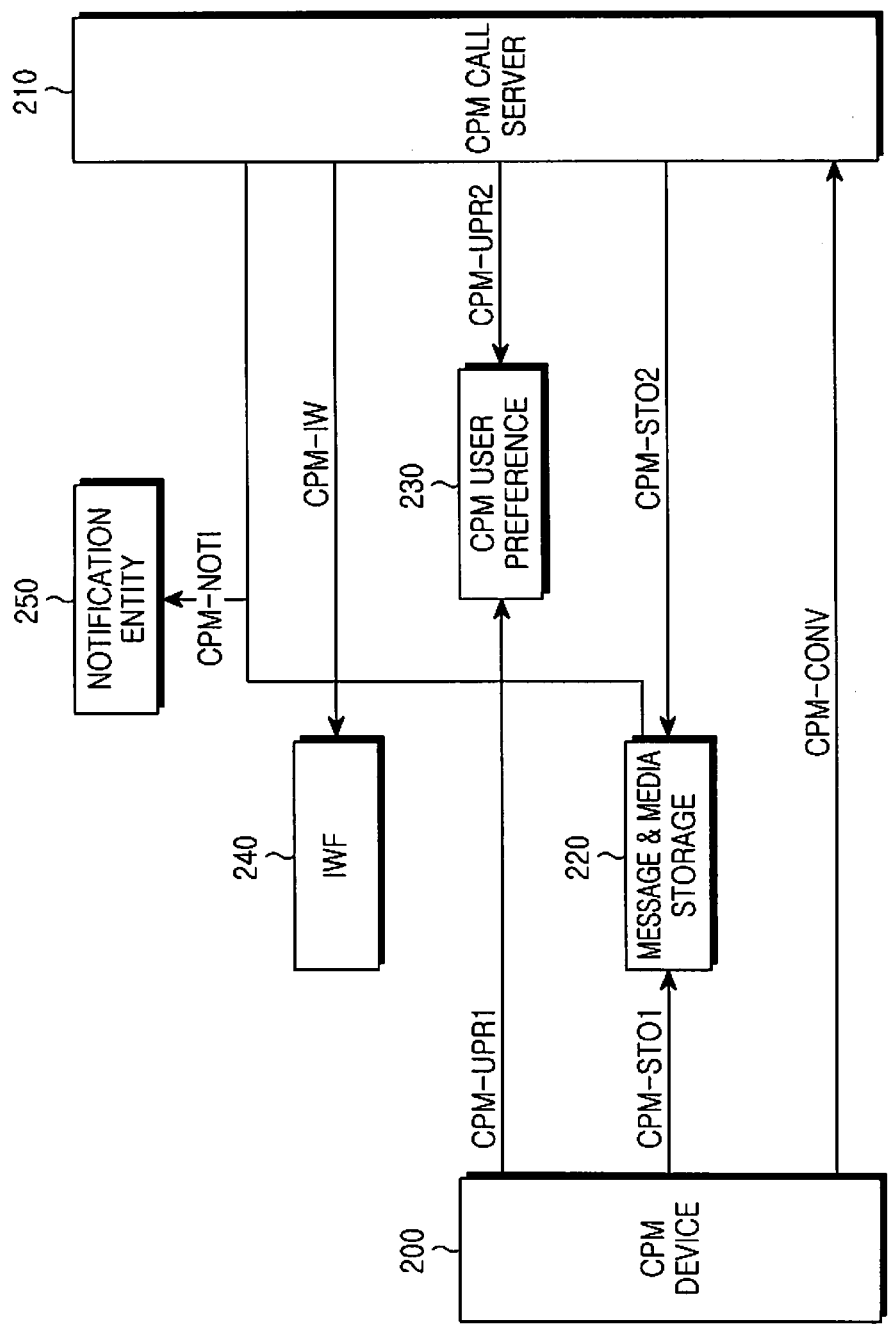
FIG. 1 is a block diagram showing a configuration of a CPM system according to an embodiment of the present invention.

FIG. 1 is a block diagram showing a configuration of a CPM system according to an embodiment of the present invention.

A CPM system for session transfer according to an embodiment of the present invention includes a CPM device 200, a CPM call server (or a call server) 210, and a message & media storage 220. The CPM device 200, a service requestor, generates a session with the remote CPM device (not shown) by means of the CPM call server 210 and communicates with the remote CPM device using the generated session. The message & media storage 220 stores session data transmitted and received in the currently established session.

In addition to the above components, the CPM system may include a CPM user preference 230, an Inter-Working Function (IWF) 240, and a notification entity 250. The CPM user preference 230 may decide whether to store session data in the message & media storage 220 depending on the user preferences in the CPM system.

Describing interfaces between the components, the Internet Message Access Protocol (IMAP) protocol may be used for signaling between the CPM device 200 and the message & media storage 220, and between the CPM call server 210 and the message & media storage 220. Session Initiation Protocol (SIP), Message Session Relay Protocol (MSRP) and Real-time Transfer Protocol (RTP) protocols may be used as Converged internet Protocol Messaging-CONVersion (CPM-CONV) protocol between the CPM device 200 and the CPM call server 210.

Prior to a detailed description of the present invention, the terms used in the present invention will be defined in detail.

The term "session" as used in the present invention includes a messaging session and/or a continuous media session. A "messaging session" is a session for exchanging messages, files, photos, etc. between users, and refers to a session used for discrete media. As opposed to the messaging session, the "continuous media session" refers to a voice chatting session used for video conferencing or voice chatting, and other forms of continuous media.

The term "session history" refers to the set of all data that has been exchanged between users from the beginning of a messaging session. The session history is needed to allow a user to check the dialog situation, i.e. messages received and sent by users, before session transfer and after session transfer.

The present invention provides a scheme in which when a user needs to transfer a session from a source device to a target device, the session is transferred by a session transfer request of the target device. This scheme, in which a session is transferred by a session transfer request of a target device is called "Target Device-Initiated Session Transfer (TIST)." Although the following description will be given with reference to the CPM system, the present invention may be applied to all session transfer methods between devices when one user uses multiple devices in a service (e.g., PoC and IM) implemented over the SIP/IP Core network.

Key concepts of the present invention will be described below.

For the target device-initiated session transfer, a target device sends a request for a separate session to facilitate the transmission of a session list of a source device to a call server in which a separate session (hereinafter referred to as an "Info session") is set up in response thereto, and acquires the session list of the source device from the call server through the Info session. The target device selects a particular session from the session list provided through the Info session, and sends a session transfer request for the particular session to the call server. In order to provide seamless communication before and after the session transfer, the call server temporarily stores in its temporary space the data that is transmitted from the remote device after it received the session transfer request.

The call server sets up a separate session (hereinafter referred to as an "early media session") to use in transmitting temporary data to the target device. If the early media session is generated, the call server ends the temporary storage and transmits the temporarily stored data to the target device through the early media session. The call server does not transfer the particular session to the target device until the transmission of the temporarily stored data is completed.

Meanwhile, the session history needs to be transmitted to the target device. The session history may be transmitted before or after the session transfer.

If the session history is transmitted before the session transfer, the target device may provide continuity of the call to the user by displaying the session history for the user immediately after the session transfer. Since it is now before the session transfer, the session history may be transmitted through the early media session. In this case, the target device can display the session history and the temporarily stored message for the user immediately after the session transfer, so the user may immediately view the dialog situation before the session transfer.

On the other hand, if the session history is transmitted after the session transfer, the target device displays the temporarily stored data for the user immediately after the session transfer, additionally acquires the session history after the session transfer, and only then displays the acquired session history for the user. In this case, since the particular session has already been transferred, the session history may be transmitted through the transferred particular session. If the session history is transmitted after the session transfer in this way, the time of the session transfer is reduced, so the target device may minimize the remote user's inconvenience due to the time delay caused by the session transfer. However, the user of the target device cannot view the session history immediately after the session transfer, but since he may soon be provided with the session history through the transferred particular session, the target device user's inconvenience caused by the time delay may not be significant.

An entity in which the session history is stored may be the call server itself or a separate entity. It will be assumed herein that the session history is stored in the message & media storage.

When the session history is stored in the call server itself, the call server may directly transmit the session history to the target device. However, if the session history is stored in the message & media storage, the call server may retrieve and acquire the session history from the message & media storage and transmit the acquired session history to the target device, or may instruct the target device to retrieve and acquire the session history from the message & media storage and then the target device may, itself, directly acquire the session history.

Based on the key concepts of the present invention, four representative embodiments of the present invention will be described below. In the first embodiment, the session history stored in the message & media storage is transmitted before the session transfer. In the second embodiment, the session history stored in the message & media storage is transmitted after the session transfer. In the third embodiment, the target device receives an instruction of the call server and acquires the session history stored in the message & media storage. In the fourth embodiment, the session history is stored in the call server itself.

While CPM will be considered in the embodiments of the present invention, the present invention may be applied to all services implemented over the SIP/IP Core network such as, for example, PTT over Cellular (PoC) and Instant Messaging (IM).

Message formats that can be used for the above-described operations will be described in connection with Table 1 to Table 8 below.

Regarding the message formats with which the target device sends a request for a session list to the call server, examples of SIP INFO Method, SIP Message Method, and SIP SUBSCRIBE Method formats will be described in connection with Table 1, Table 5 and Table 7, respectively, and examples of their associated response formats of the call server will be described in connection with Table 2, Table 6 and Table 8, respectively. Use of the SIP Message Method and the SIP SUBSCRIBE Method makes it unnecessary to generate a separate session (or Info session) for session list transmission.

An example of a SIP INVITE METHOD format with which the target device can send a session transfer request for a particular session will be described in connection with Table 3, and an example of a SIP MESSAGE METHOD format with which the call server can instruct the target device to acquire a session history will be described in connection with Table 4. The present invention will be described in detail below with reference to the drawings and tables.

Figure 2:
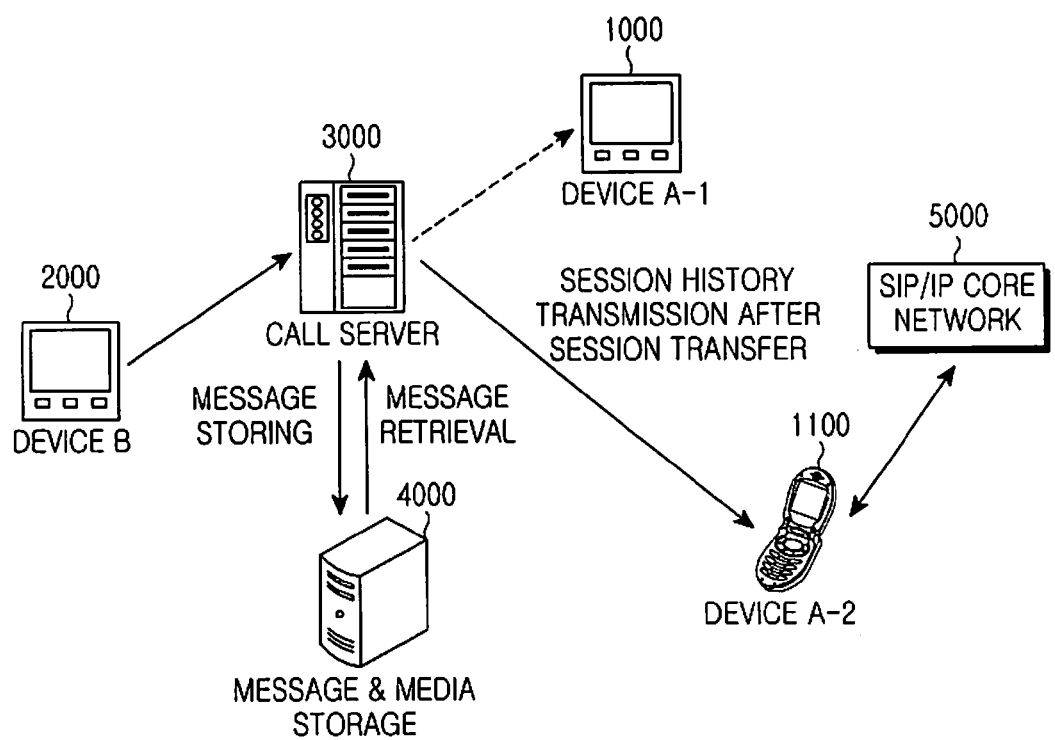
FIG. 2 is a diagram showing the concept of session transfer in a CPM system according to an embodiment of the present invention.

FIG. 2 is a diagram showing the concept of session transfer in a CPM system according to an embodiment of the present invention.

One user may use multiple devices (e.g., multiple mobile terminals). It is assumed in FIG. 2 that a user A uses first and second devices, a user B uses a device B, and the user A transfers a session between the first and second devices. The first device is a source device and the second device is a target device.

In FIG. 2, it is assumed that a device A-1 1000 and a device A-2 1100 are owned by the user A, and a device B 2000 is owned by the user B. In this situation, device A-1 1000 and device B 2000 are connected to the call server 3000 by way of an SIP session (a source session), and user A intends to connect device A-2 1100 to a session (a target session) of the call server 3000 in order to continue communication with device B 2000 of the user B using device A-2 1100. The call server 3000 and a message & media storage 4000 may communicate using the Internet Message Access Protocol 4 (IMAP4)/Lemonade protocol. In the present invention, the message & media storage 4000 may store a session history. However, the session history may be managed directly by device A-1 1000, rather than by the message & media storage 4000, according to the CPM user preferences and the service policy. The session history may also be stored in the call server 3000.

If it is necessary for the user A to change devices and communicate using the new device during his communication with the remote using device A-1 1000, device A-2 1100 or the target device acquires device information of the user A through message exchange with an SIP/IP core network 5000. A detailed message exchange method will be described below.

Device A-2 1100 sets up a separate session (hereinafter called "Info session") with the call server 3000, and acquires a session list of device A-1 1000 through message exchange in the Info session. Thereafter, device A-2 1100 closes the Info session that was separately set up with the call server 3000. Thereafter, device A-2 1100 sends a request for session transfer, for a particular session in the acquired session list, to the call server 3000.

The call server 3000 performs session transfer after receiving the session transfer request. To provide seamless communication services, the call server 3000 temporarily stores the message provided from device B 2000 of the remote user. After completing the temporary storage, the call server 3000 transmits the temporarily stored message to device A-2 1100 using the MSRP protocol.

Meanwhile, a session history may be stored in the message & media storage 4000. Device A-2 1100 acquires the session history stored in the message & media storage 4000 via the call server 3000, or directly accesses the message & media storage 4000 to acquire the session history. The session history transmission time and the session history reception method are determined by the CPM user preference and the service policy. The session history may also be stored on the call server 3000 itself.

According to the foregoing description, the target device-initiated session transfer method of the present invention needs a procedure (1) for acquiring source device information and session information by the target device; (2) for requesting to transfer a session of the source device; (3) for acquiring the data temporarily stored during session transfer; and (4) for acquiring a session history. The present invention, which includes these procedures, will be described below in more detail.

Figure 3A:
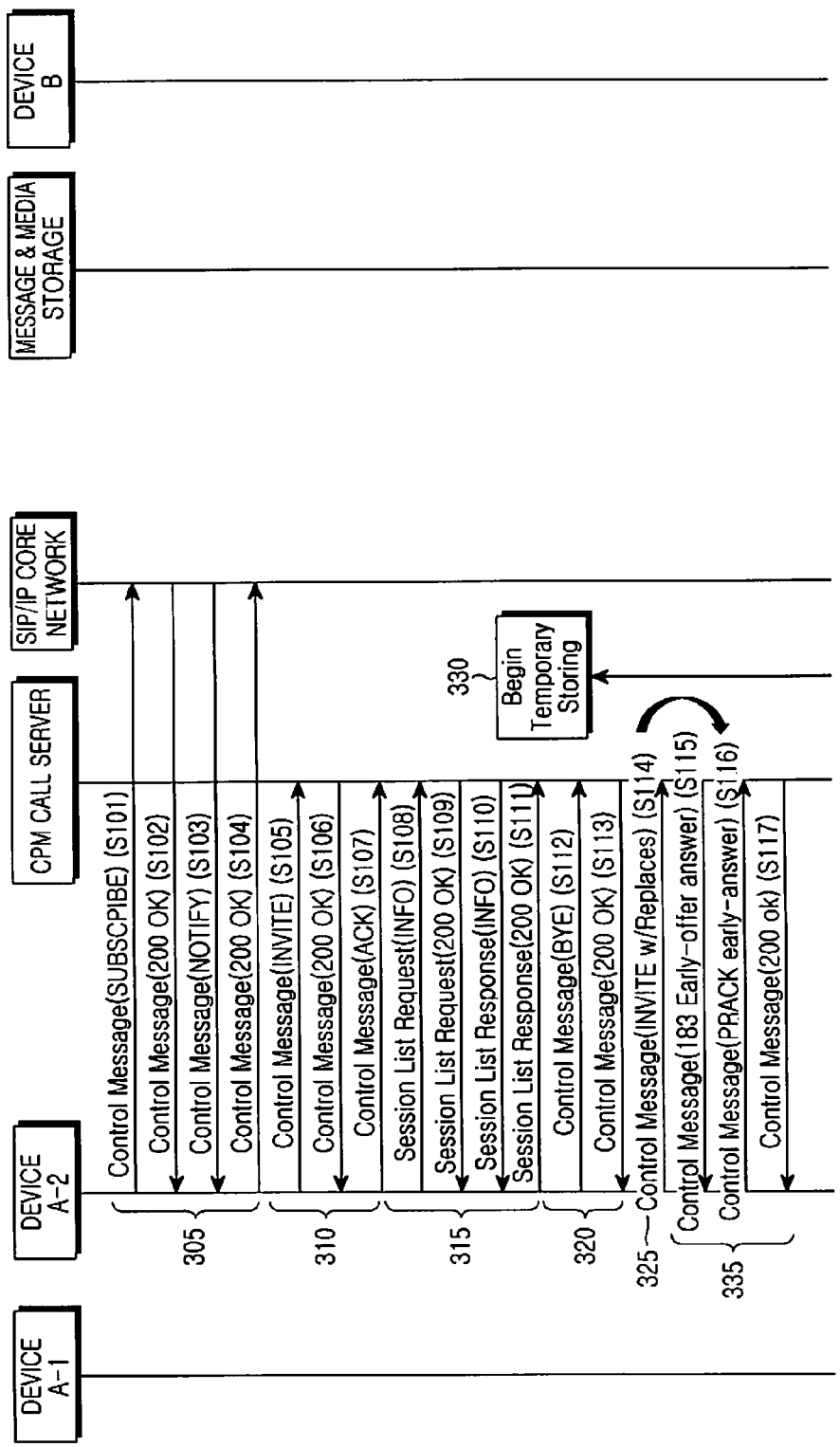
FIGS. 3A and 3B are diagrams showing a call flow in a CPM system according to a first embodiment of the present invention.
Figure 3B:
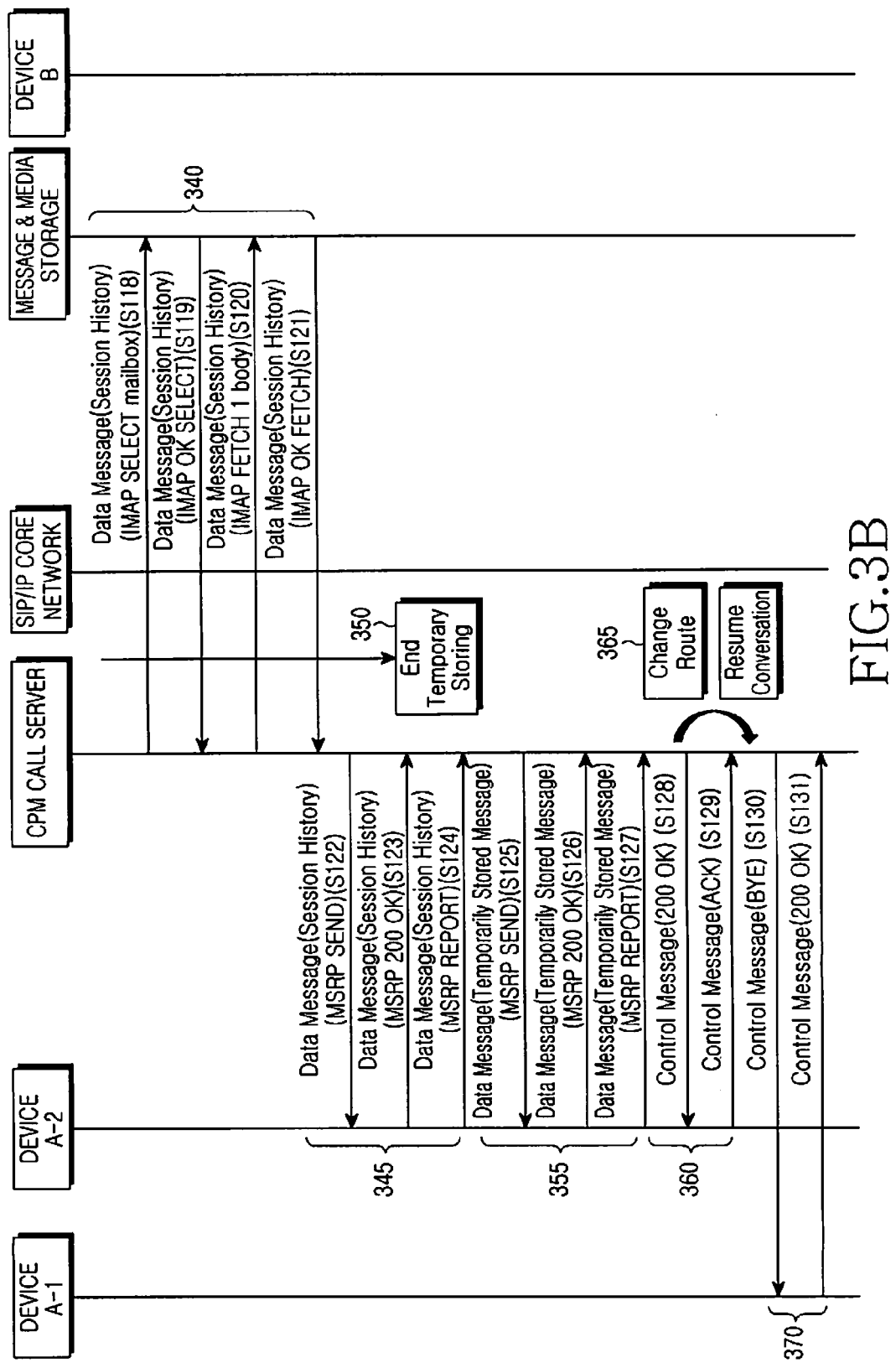

FIGS. 3A and 3B are diagrams showing a call flow in a CPM system according to a first embodiment of the present invention. In the first embodiment, the target device, or device A-2, receives the session history before the session transfer.

In step 305, a device A-2 acquires a user's device list through message exchange with an SIP/IP core network. That is, device A-2 sends a SUBSCRIBE message requesting a device list of a user, A, to the SIP/IP core network in step S101. The SIP/IP core network sends an OK response in reply to the SUBSCRIBE message in step S102, and sends a NOTIFY message with a user's device list to device A-2 in step S103. Device A-2 sends an OK message in reply to the NOTIFY message in step S104.

In step 310, device A-2 requests a separate session (Info session) for transmitting a session list, and the call server generates an Info session in reply to the request. That is, device A-2 sends an INVITE message to the call server for generation of an Info session in step S105. The call server sends an OK message in reply to the INVITE message in step S106, and device A-2 sends an ACK in reply to the OK message in step S107. Then, an Info session is generated.

In step 315, device A-2 requests the call server to provide a session list of a device A-1, and acquires the session list. That is, device A-2 sends an INFO message requesting the current session list of device A-1 to the call server in step S108. The call server sends an OK message in reply thereto in step S109, and transmits the current session list of device A-1 using an INFO message in step S110. Device A-2 sends the OK message to the call server in reply to the received INFO message in step S111. The used SIP INFO message will be described below in connection with Table 1 and Table 2.

In step 320, device A-2 closes the Info session since it has received the session list. That is, device A-2 sends a BYE message to the call server in step S112, and the call server responds with an OK message in step S113. Thereafter, the Info session is closed.

In step 325, device A-2 selects a session to be transferred from the session list of device A-1, and sends a request for session transfer to the call server. That is, device A-2 sends a session transfer request message for transfer of the selected session in step S114. An INVITE message defined in the SIP protocol may be used as the session transfer request message. A format of the INVITE message is described below in connection with Table 3.

In step 330, the call server performs temporary storing after receiving the session transfer request. That is, the call server temporarily stores the messages that a user B sends while the session transfer is performed in response to the session transfer request in step 325.

In step 335, the call server generates a separate session for transmitting the session history and temporarily stored data needed for session transfer to device A-2. The generated session is called an early media session. That is, the call server sends a control message or a 183 Early-offer answer message in reply to the INVITE message in step S115. Device A-2 sends a control message or a Provisional Response Acknowledgement (PRACK) early-answer message to the call server in reply thereto in step S116. If the call server responds with a control message or a 200 OK message in step S117, an early media session is generated between device A-2 and the call server.

In FIG. 3B, step 340, the call server acquires a session history stored in a message & media storage. That is, the call server sends a SELECT message or a data message defined in the IMAP protocol to the message & media storage and selects a storage space of the user A, stored on the message & media storage in step S118. If the message & media storage responds to the storage space selection in step S119, the call server retrieves the stored session history by sending an IMAP FETCH message to the message & media storage in step S120. Thereafter, if the message & media storage transmits the retrieved session history to the call server in step S121, the call server temporarily stores the transmitted session history.

In step 345, the call server transmits the temporarily stored session history to device A-2 through the early media session. That is, the call server transmits the session history to device A-2 through a data message or an MSRP SEND message in step S122. Device A-2 sends an OK message to the call server in reply to the transmission of the session history in step S123, and sends an MSRP REPORT message indicating the completed reception of the session history to the call server in step S124.

In step 350, the call server ends the temporary data storing that began in step 330, because its session history transmission has been completed.

In step 355, the call server transmits the temporarily stored data to device A-2 through the early media session. That is, the call server transmits the temporarily stored data to device A-2 through a data message or an MSRP SEND message in step S125. Device A-2 sends a response thereto to the call server in step S126, then completing the transmission of the temporarily stored data. Thereafter, device A-2 informs the call server of its completed reception of the temporarily stored data using a data message or an MSRP REPORT message in step S127.

In step 360, the call server generates a session with device A-2 after a series of the above processes. That is, the call server sends an OK message in reply to the session transfer request included in the INVITE message received in step S114 and generates a session with device A-2 in step S128, and device A-2 sends an OK message as an ACK in reply thereto in step S129.

Since the session generation between device A-2 and the call server has been completed, the call server changes the route to connect a call with the user B to device A-2 in step 365. Then device A-2 displays for the user the session history and temporarily stored message received from the call server, and thereafter, user A resumes the call with user B using device A-2.

In step 370, the call server sends a BYE message to device A-1 to close the old session of device A-1 in step S130, and device A-1 sends an OK message acknowledging the session closing to the call server in step S131.

Figure 4A:
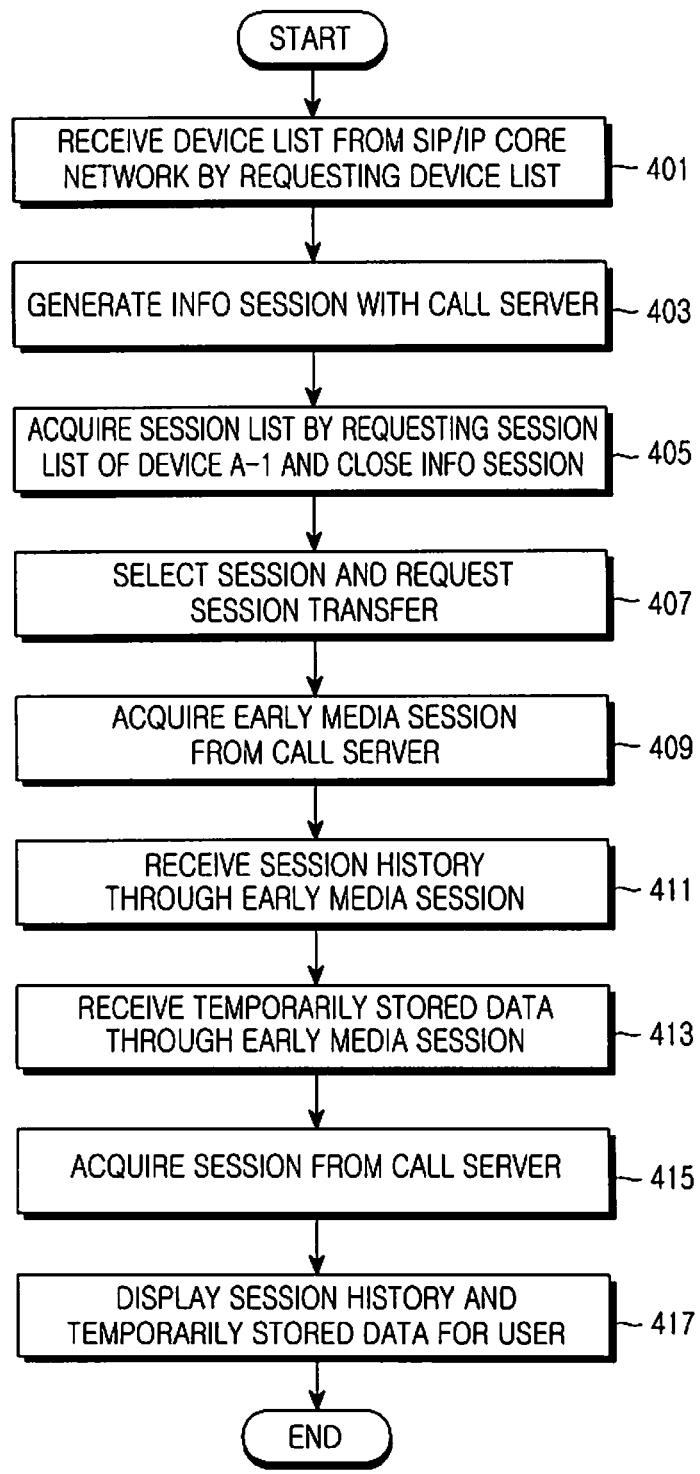
FIG. 4A is a diagram showing a control flow performed in a device A-2 according to the first embodiment of the present invention.

FIG. 4A is a diagram showing the control flow performed in a device A-2 according to the first embodiment of the present invention.

In step 401, device A-2 receives a device list by sending a request for a device list to an SIP/IP core network. In step 403, device A-2 generates an Info session with a call server. In step 405, device A-2 requests a session list for a particular device (e.g., device A-1), and closes the Info session upon receiving the session list from the call server. In step 407, device A-2 selects a particular session from the received session list and requests session transfer for the particular session. In step 409, device A-2 acquires an early media session through message exchange according to a response that the call server has sent in reply to the session transfer request. Device A-2 receives a session history through the early media session in step 411, and receives the temporarily stored data through the early media session in step 413. The order of steps 411 and 413 is exchangeable. Thereafter, in step 415, device A-2 acquires the particular session from the call server by receiving a message with which the call server accepts the session transfer request made in step 407. In step 417, device A-2 displays the received session history and temporarily stored data for the user, and then maintains the call with the remote user.

Figure 4B:
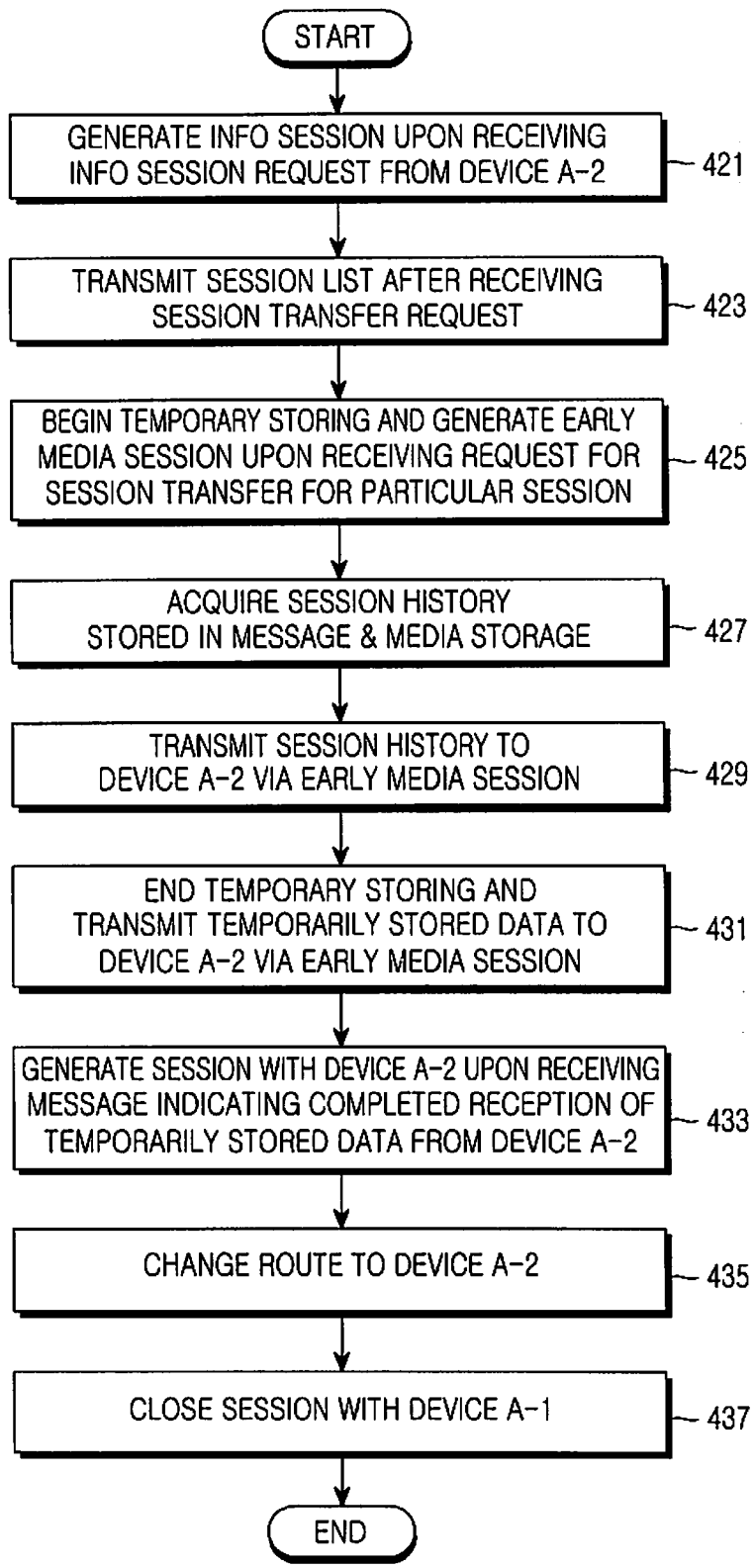
FIG. 4B is a diagram showing a control flow performed in a call server according to the first embodiment of the present invention.

FIG. 4B is a diagram showing the control flow performed in a call server according to the first embodiment of the present invention.

In step 421, the call server generates an Info session upon receiving a request for generation of an Info session from a device A-2. In step 423, the call server transmits a session list of a device A-1 to device A-2 through the Info session upon receiving a session list request for device A-1 from device A-2. In step 425, upon receiving a session transfer request for a particular session from device A-2, the call server begins temporarily storing of the data being transmitted from the remote user or a user B, and sets up an early media session through message exchange with device A-2. In step 427, the call server acquires a session history stored in a message & media storage. In step 429, the call server transmits the acquired session history to device A-2 through the early media session. Thereafter, in step 431, the call server ends the temporary storage and transmits the temporarily stored data to device A-2 through the early media session. In step 433, upon receiving a message indicating the completed reception of the temporarily stored data from device A-2, the call server generates a session with device A-2 by sending a message accepting the session transfer request from device A-2. In step 435, the call server changes the route to connect the call with the user B to device A-2. In step 437, the call server closes the session with device A-1, completing the session transfer.

Figure 5B:
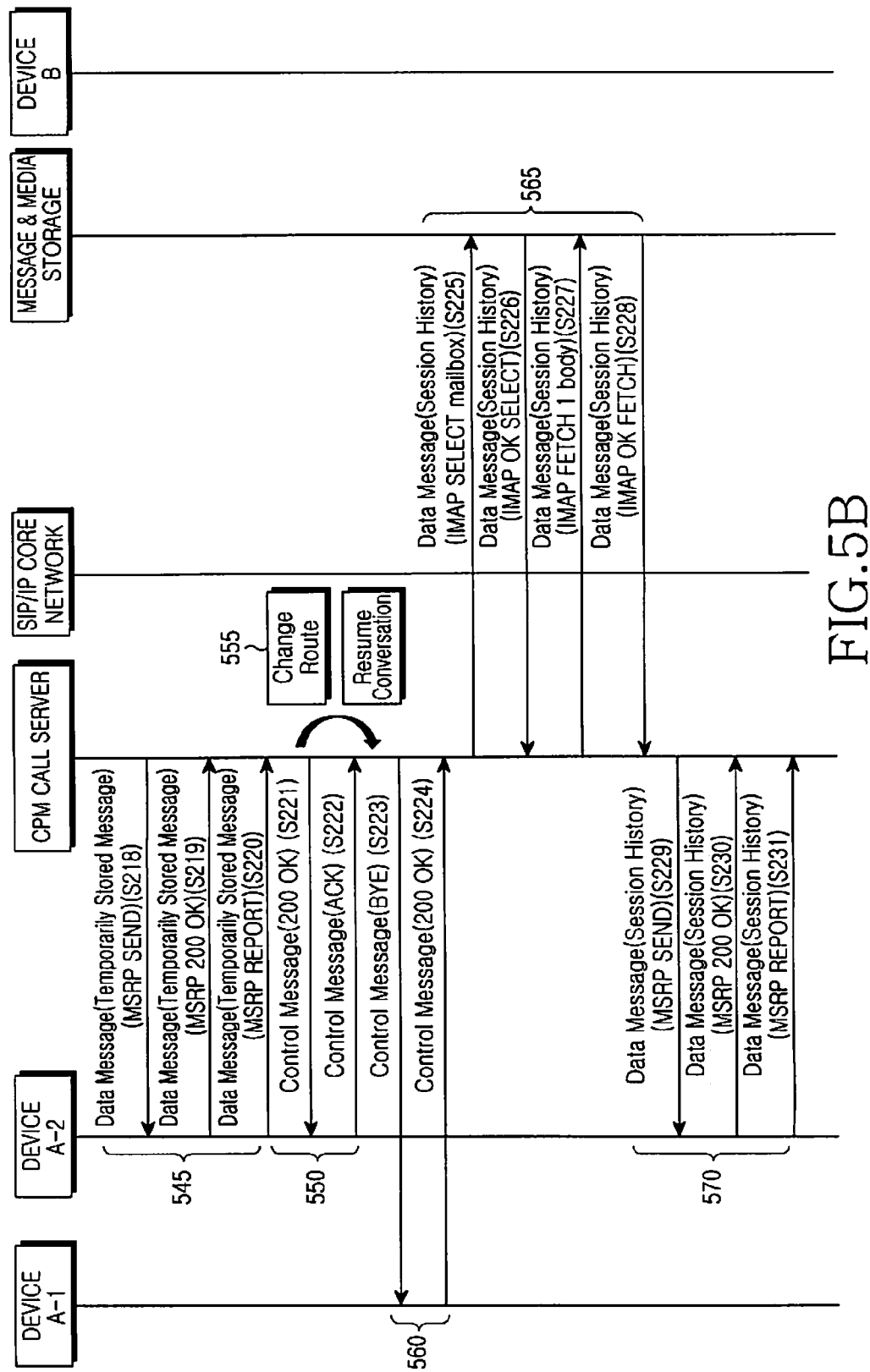

FIGS. 5A and 5B are diagrams showing a call flow in a CPM system according to a second embodiment of the present invention. In the second embodiment, device A-2 receives the session history after the session transfer. Steps 505 to 535 are the same in operation as steps 305 to 335 of FIGS. 3A and 3B. That is, device A-2 acquires a device list from an SIP/IP core network in step 505, an Info session is generated in step 510, device A-2 acquires a session list in step 515, and the Info session is closed in step 520. If device A-2 requests session transfer in step 525, the call server begins temporary storing in step 530, and generates an early media session in step 535.

After the above process, the second embodiment is different in operation from the first embodiment. That is, in the first embodiment, the call server acquires the session history in step 340, transmits the acquired session history to device A-2 in step 345, ends temporary data transmission in step 350, and transmits the temporarily stored data to device A-2 in step 355. Thereafter, the call server changes the route in step 365, and closes the session with device A-1 in step 370. However, in the second embodiment, the call server first transmits the session history to device A-2 after transmitting the temporarily stored data to device A-2 and closing the session with device A-1.

Specifically, if the early media session is generated in step 535, the temporary storing is ended in step 540. In FIG. 5B, step 545, if the call server transmits the temporarily stored data to device A-2 through the early media session in step S218, device A-2 sends a control message or an MSRP 200 OK message in reply thereto in step S219. If the reception of the temporarily stored data is completed, device A-2 sends a reception complete message for the temporarily stored data to the call server in step S220. If a series of the above processes is completed, the call server sends a message accepting the session transfer request made in step 525 and device A-2 sends an ACK message in reply thereto, generating a session between the call server and device A-2, in step 550. Thereafter, in step 555, the call server changes the route to device A-2 regarding a device B of the remote user. In step 560, the call server closes the session with device A-1. The call server acquires a session history from a message & media storage in step 565, and transmits it to device A-2 in step 570. The session history is then transmitted through the transferred session.

Figure 6A:
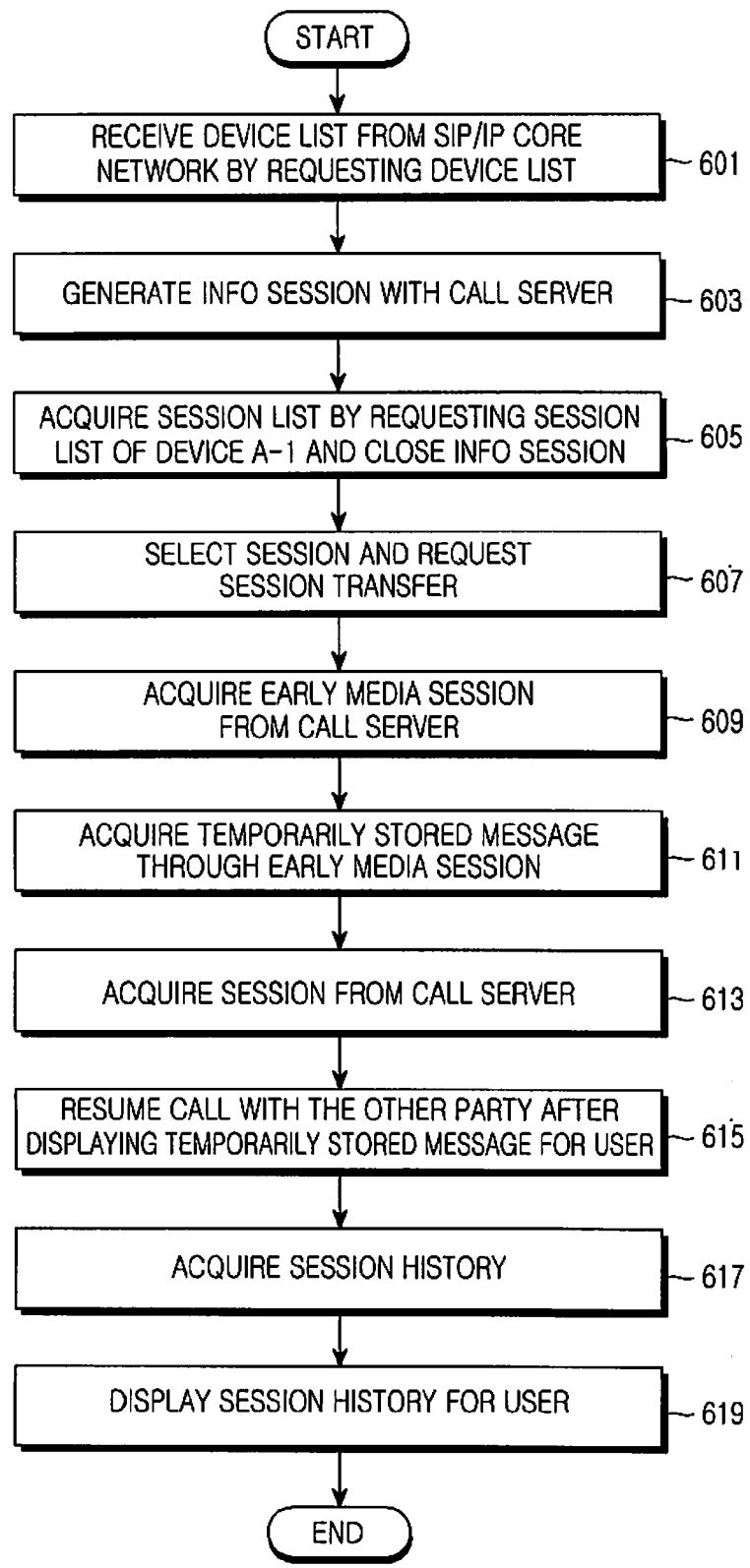
FIG. 6A is a diagram showing a control flow performed in a device A-2 according to the second embodiment of the present invention.

FIG. 6A is a diagram showing a control flow performed in a device A-2 according to the second embodiment of the present invention.

Steps 601 to 609 are the same in operation as steps 401 to 409 of FIG. 4A. Thereafter, in step 611, device A-2 acquires the temporarily stored message from the call server through the early media session. In step 613, device A-2 acquires a session with the call server by receiving a message accepting the session transfer request from the call server. In step 615, if device A-2 displays the acquired temporarily stored message for the user, the call between device A-2 and the device B is resumed. Device A-2 acquires a session history through the transferred session in step 617, and displays the acquired session history for the user in step 619.

Figure 6B:
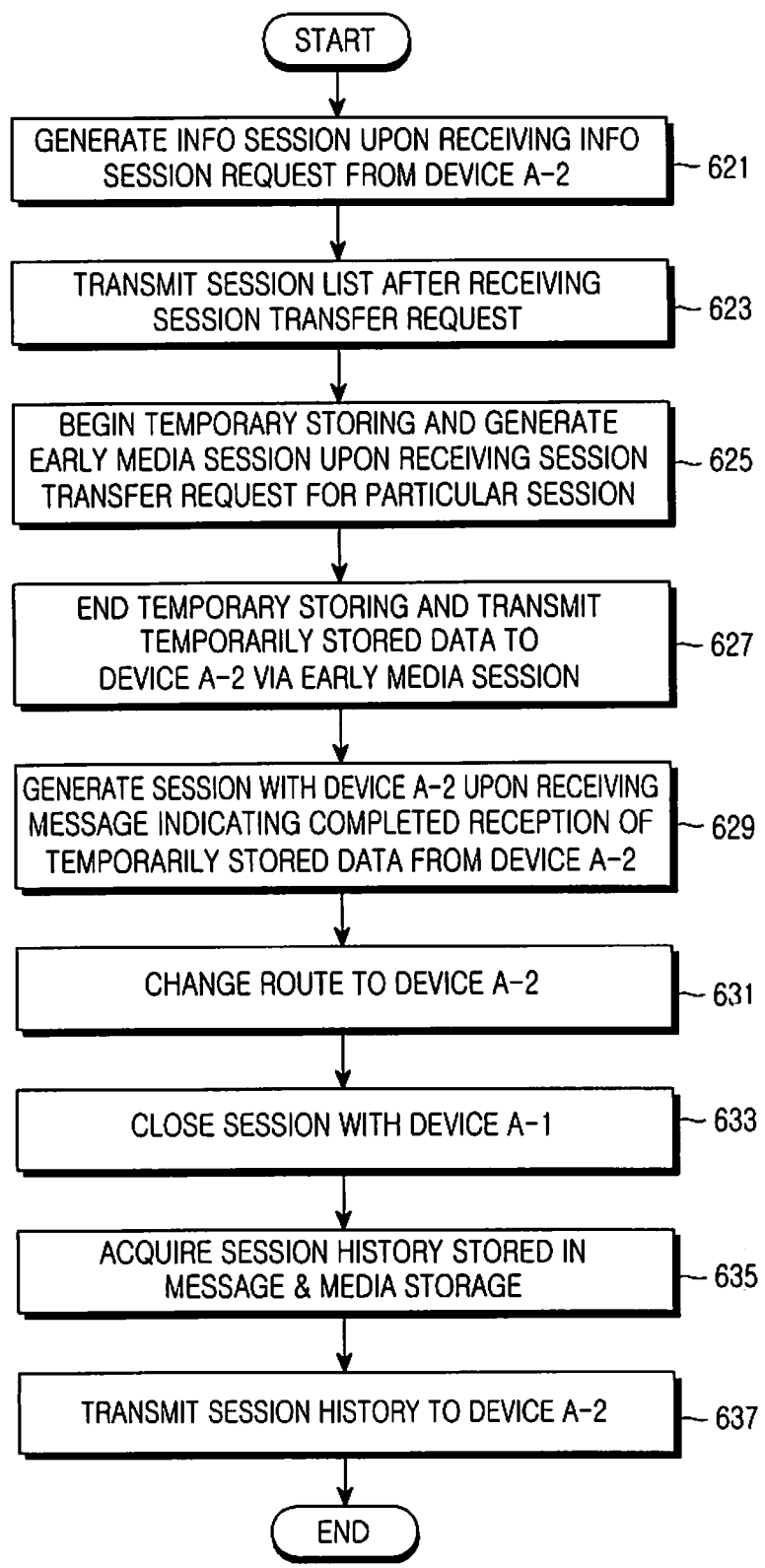
FIG. 6B is a diagram showing a control flow performed in a call server according to the second embodiment of the present invention.

FIG. 6B is a diagram showing a control flow performed in a call server according to the second embodiment of the present invention.

Steps 621 to 625 are the same as steps 421 to 425 of FIG. 4B, so a description thereof is omitted. In step 627, the call server ends the temporary storage and transmits the temporarily stored data to device A-2 through the early media session. In step 629, upon receiving a message indicating the completed reception of the temporarily stored data from device A-2, the call server generates a session with device A-2 by sending a message accepting the session transfer request of device A-2. The call server changes the route to connect device B with device A-2 in step 631, and closes the session with device A-1 in step 633. Thereafter, the call server acquires a session history stored in a message & media storage in step 635, and transmits the acquired session history to device A-2 through the transferred session in step 637.

Figure 7A:
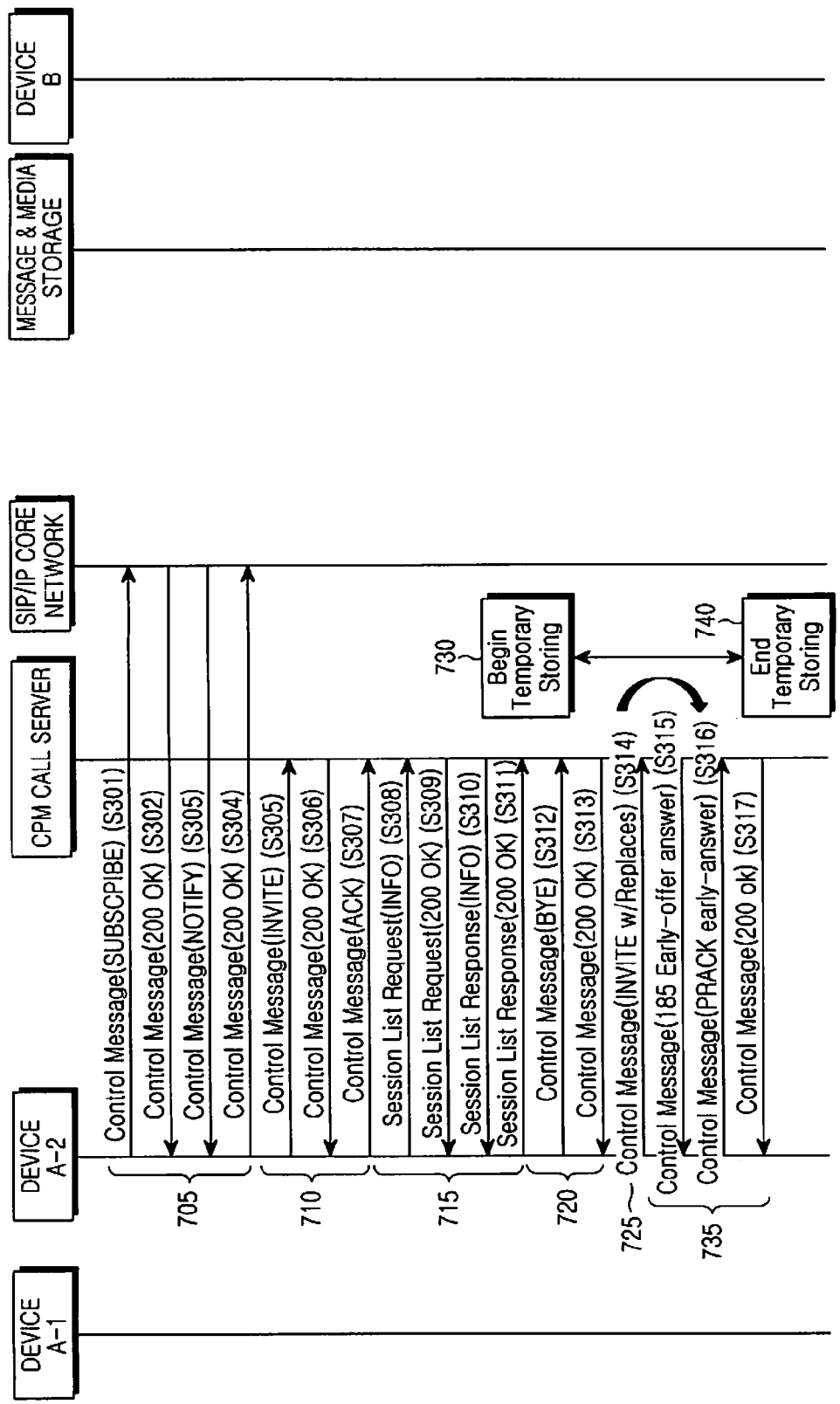
FIGS. 7A and 7B are diagrams showing a call flow in a CPM system according to a third embodiment of the present invention.
Figure 7B:
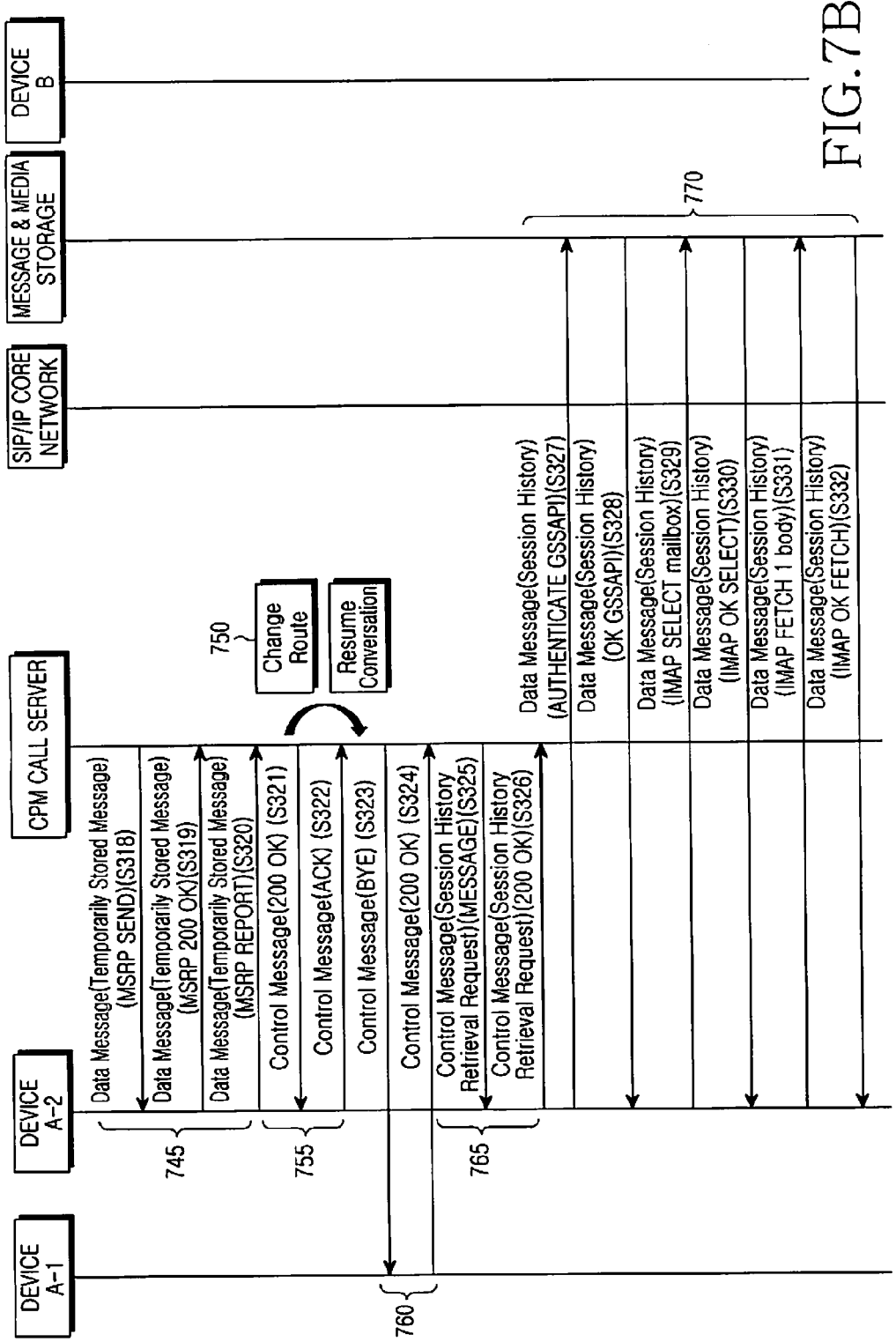

FIGS. 7A and 7B are diagrams showing a call flow in a CPM system according to a third embodiment of the present invention. The third embodiment is different from the second embodiment in that device A-2 acquires a session history directly from the message & media storage, rather than through the call server.

Specifically, steps 705 to 760 are the same in operation as steps 505 to 560 of FIGS. 5A and 5B. In step 760, device A-2 resumes a call with device B, and closes the session with device A-1.

In step 765, the call server sends a message instructing device A-2 to acquire a session history from the message & media storage. That is, the call server sends a control message with a Session History Retrieval Request to device A-2 in step S325. The control message includes information about a location of the message & media storage, in which the session history is stored, and its format will be described in connection with Table 4 below. In response thereto, device A-2 sends a control message or a 200 OK message in step S326.

In step 770, device A-2 directly acquires the session history though message exchange with the message & media storage based on the location information for the session history. Specifically, device A-2 uses the IMAP protocol to acquire the session history stored in the message & media storage. Device A-2 sends a data message or an AUTHENTICATE message to log in the message & media storage in step S327. In response thereto, the message & media storage sends a log-in check message to device A-2 in step S328. Thereafter, the device A-2 sends an IMAP SELECT message to the message & media storage to select a storage space for the user A, which is located in the message & media storage, in step S329. Thereafter, the message & media storage sends a response (IMAP OK SELECT) to the selection of the storage space in step S330. Thereafter, if device A-2 sends an IMAP FETCH message to the message & media storage to acquire the session history stored in the message & media storage in step S331, the message & media storage transmits the session history stored in the selected storage space to device A-2 in step S332.

Figure 8A:
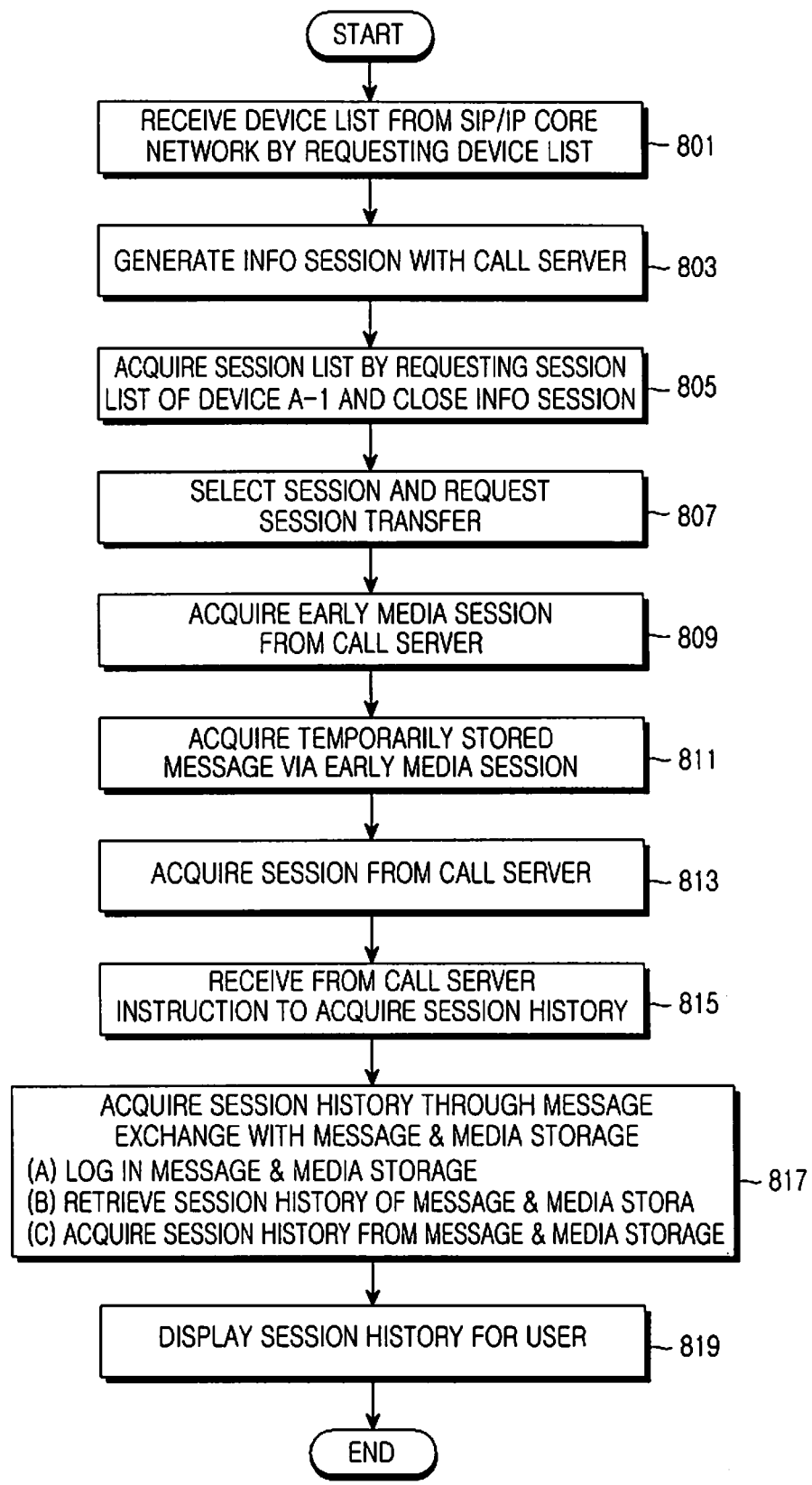
FIG. 8A is a diagram showing a control flow performed in a device A-2 according to the third embodiment of the present invention.

FIG. 8A is a diagram showing a control flow performed in a device A-2 according to the third embodiment of the present invention.

Steps 801 to 813 are the same in operation as steps 601 to 613 of FIGS. 6A and 6B. Thereafter, in step 815, device A-2 acquires from the call server, a message instructing it to acquire a session history. In step 817, device A-2 accesses the message & media storage to acquire the session history based on the message. More specifically, device A-2 logs in the message & media storage and retrieves the session history. Thereafter, device A-2 displays the session history for the user in step 819.

Figure 8B:
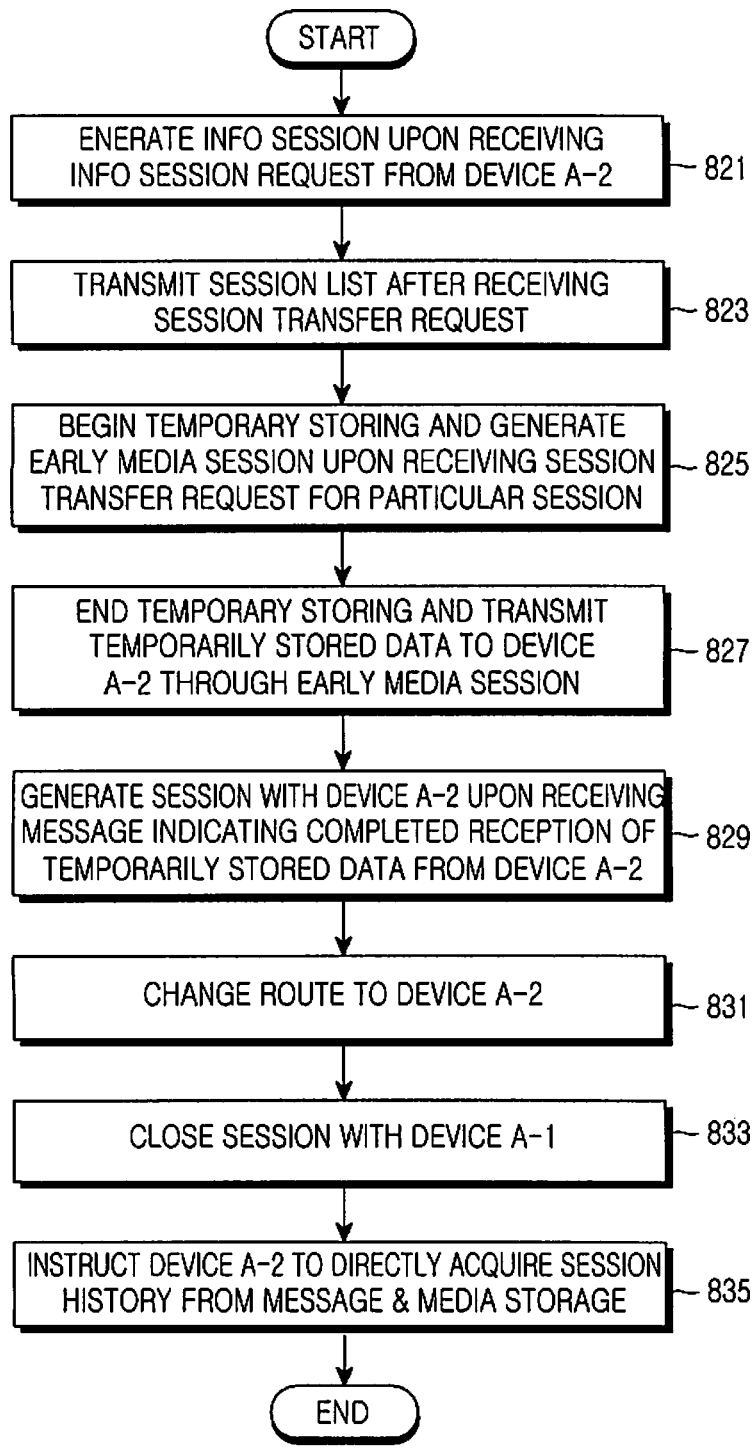
FIG. 8B is a diagram showing a control flow performed in a call server according to the third embodiment of the present invention.

FIG. 8B is a diagram showing a control flow performed in a call server according to the third embodiment of the present invention.

Steps 821 to 833 are the same as steps 621 to 633 of FIG. 6B, so a description thereof is omitted. In step 835, the call server sends a message instructing device A-2 to directly acquire the session history.

Figure 9B:
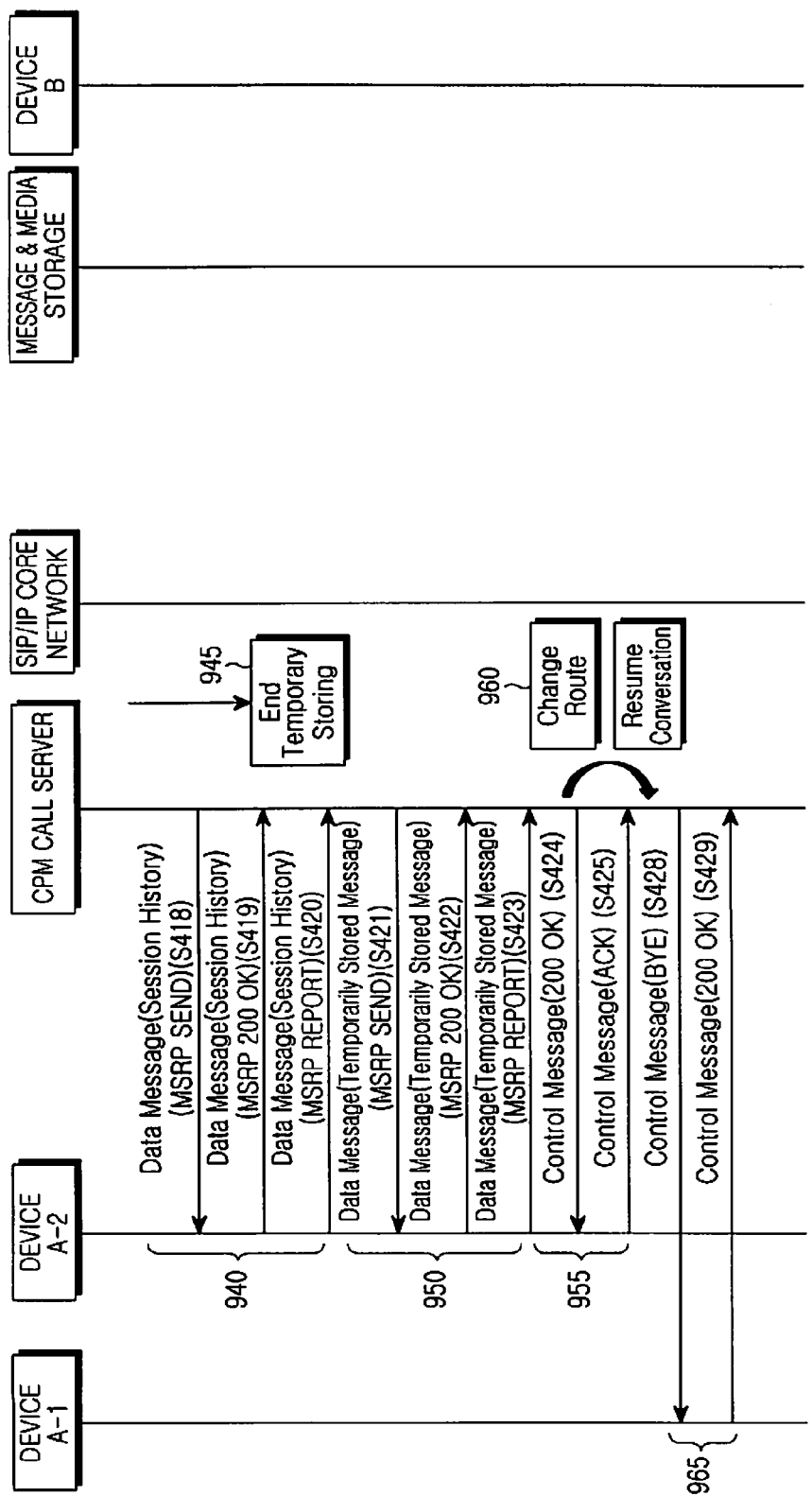

FIGS. 9A and 9B are diagrams showing a call flow in a CPM system according to a fourth embodiment of the present invention. While the session history is stored in the message & media storage in the first to third embodiments, the session history is stored on the call server in the fourth embodiment. A description of the fourth embodiment will be given, focusing on the different operations than that of FIGS. 3A and 3B.

Steps 905 to 935 are the same in operation as steps 305 to 335 of FIGS. 3A and 3B, and an early media session is generated in step 935. In step 940, the call server transmits the session history stored therein to device A-2 through the early media session. However, unlike in the first embodiment of FIGS. 3A and 3B, the operation of acquiring a session history from the message & media storage is not included. The call server ends the temporary storage in step 945, and transmits the temporarily stored data to device A-2 through the early media session in step 950. The call server generates a session by sending a message accepting the session transfer request to device A-2 in step 955 and changes the route to device A-2 in step 960. Thereafter, if device A-2 displays the session history and the temporarily stored data for the user, the call between device A-2 and device B is resumed, and the call server closes the session with device A-1 in step 965.

Operations of device A-2 and the call server according to the fourth embodiment of the present invention will be described with reference again to FIGS. 4A and 4B, respectively.

In the fourth embodiment, an operation of device A-2 is the same as that of FIG. 4A corresponding to the first embodiment. The difference in call flow between the fourth embodiment in FIGS. 9A and 9B and the first embodiment in FIGS. 3A and 3B lies in that there is no process of acquiring a session history from the message & media storage by the call server. Therefore, in the fourth embodiment, the operation of device A-2 is not different from the operation in the first embodiment. Meanwhile, the operation of the call server in the fourth embodiment is equal to the operation of FIG. 4B with step 427 excluded.

Message formats used for the present invention will be described with reference to Table 1 to Table 8 below.

Table 1 shows an example of an SIP INFO format that device A-2 uses to request a session list.

TABLE 1

INFO sip:CPMSERVER@home.net sip/2.0
Via: SIP/2.0/UDP alice.cpm.home.net:5060
From: <sip:alice@home.net>;tag=8942
To: <sipCPMSERVER@home.net>;tag=d3f423d
Call-ID: 3xtT2qw01
CSeq: 5 INFO
Contact: sip: alice@@192.0.100.3
Content-Length: XXX

| Content-Type:application/TargetSessionTransferSessionListRequest+XML | :P1 |

| <?xml version="1.0"?><br><TargetSessionTransferSessionListRequest version="1.0"><br>    <Device><br>        <SIPURI></SIPURI><br>    </Device><br></TargetSessionTransferSessionListRequest> | :P2 |

In the message of Table 1, "TargetSessionTransferSessionListRequest" is written in Content-Type to indicate that this message is used by device A-2 to request a session list (See P1). In addition, information about the device requesting the call server may be included in the Body.

Table 2 shows an example of a response message format of the call server, which is responsive to the INFO message of Table 1 used by device A-2.

TABLE 2

INFO sip:alice@home.net sip/2.0
Via: SIP/2.0/UDP cpmserver@home.net:5060
From: <sip: CPMSERVER@home.net>;tag=d3f423d
To: <sip:alice@home.net>;tag=8942
Call-ID: 3xtT2qw01
CSeq: 5 INFO
Contact: <sip:CPMSERVER@home.net>
Content-Length: XXX
Content-Type:application/TargetSessionTransferSessionListResponse+XML    :P3

```
<?xml version="1.0"?>
<TargetSessionTransferSessionListResponse version="1.0">
<SessionList>
     <Session>
        <SessionID></SessionID>
        <DeviceID></DeviceID>
        <Media-TypeList>
             <Media></Media>
             <Media><?Media>
        </Media-TypeList>
     </Session>
     <Session>
     ...
     </Session>
</SessionList>
</TargetSessionTransferSessionListResponse>       :P4
```

In Table 2, "TargetSessionTransferSessionListResponse" is written in Content-Type to indicate that this message is includes a session list that the call server transmits to device A-2 (See P3). Additionally, information about the session list managed by the call server may be included in the Body. The session list may be managed in a function called Participating Function of the call server.

Table 3 shows an example of an INVITE message format with which device A-2 requests session transfer.

TABLE 3

INVITE sip:CPMSERVER@home.net sip/2.0
Via: SIP/2.0/UDP alice.cpm.home.net:5060
From: <sip:alice@home.net>;tag=8942
To: <sip:CPMSERVER@home.net>
Call-ID: 3as3t23e3
Replace: 3xtT2qw01;to-tag=d3f423d:from-tag=6472
CSeq: 1 INVITE
Contact: <sip:alice@@192.0.100.3>
Content-Type:application/s에
SDP PARAMETER
V=0
0=bob 2890844526 2890844526 IN IP4 wsl.domain2.com
s=

TABLE 3-continued c=IN IP4 192.0.100.2
t=0 0
m=audio 20000 RTP/AVP 0
a=rtpmap:PCMU/8000;Session Transfer Request   P5

In the sent INVITE message of Table 3, a "Replace" Header field represents information about a particular session for which device A-2 will request session transfer, and information indicating that the current INVITE message is a session transfer request message may be represented in a "Session Description Protocol (SDP) Parameter" field. That is, while the particular session information is represented in Call-ID, to-tag, and from-tag of the Replace Header, information indicating that the INVITE message is a session transfer request message may be represented in the SDP Parameter (See P5).

Table 4 shows an example of a message format that the call server uses to instruct device A-2 to directly acquire a session history from the message & media storage in the third embodiment of the present invention described in connection with FIGS. 7A and 7B.

TABLE 4

MESSAGE sip:alice@home.net sip/2.0
Via: SIP/2.0/UDP sip:cpmserver@home.net: 5060
From: <sip:CPMSERVER@home.net>;tag=d3f423d
To: <sip:alice@home.net>;tag=8942
Call-ID: 3as3t2e23e3
CSeq: 3 MESSAGE
Content-Length: XXX
Content-Type:Application/AccessMessageMediaStorageRefer+XML    :P6

TABLE 4-continued

```
<?xml version="1.0"?>
<TargetSessionTransferSessionListResponse version="1.0">
<SessionList>
    <Session>
        <SessionID></SessionID>
        <DeviceID></DeviceID>
</Session>
        <Device>
        <MMSINFO>
            <Mailbox></Mailbox>
            <Media></Media>
        </MMSINFO>                                          :P7
</AccessMessageMediaStorageRefer>
```

In the message of Table 4, "AccessMessageMediaStorageRefer" is written in Content-Type to indicate that this message instructs device A-2 to access the message & media storage to acquire a session history (See P6 in Table 4). In addition, ID of the session, SIP information of device, and Mailbox information of the message & media storage may be included in the Body (See P7 in Table 4).

Table 5 shows an example of an SIP MESSAGE format that can be used in place of the SIP INFO message defined in Table 1.

TABLE 5

MESSAGE sip:CPMSERVER@home.net sip/2.0
Via: SIP/2.0/UDP alice.cpm.home.net:5060
From: <sip:alice@home.net>;tag=8942
To: <sip:CPMSERVER@home.net>;tag=d3f423d
Call-ID: 3xtT2qw01
CSeq: 3 MESSAGE
Contact: sip:alice@192.0.100.3
Content-Length:XXX Content-Type:application/TargetSessionTransferSessionListRequest+XML   :P8

```
<?xml version="1.0"?>
<TargetSessionTransferSessionListRequest; " 1.0">
    <Device>
        <SIPURI></SIPURI>
    </Device>
</TargetSessionTransferSessionListRequest>              :P9
```

As in the INFO message of Table 1, "TargetSessionTransferSessionListRequest" is written in Content-Type to indicate that the SIP message is used by device A-2 to request a session list (See P8 in Table 5). In addition, device information for which device A-2 requests the call server may be included in the Body (See P9 in Table 5).

Table 6 shows an example of a session list response message format of the call server, which corresponds to the message format of Table 5.

TABLE 6

MESSAGE sip :alice@home.net sip/2.0
Via: SIP/2.0/UDP cpmserver@home.net:5060
From: <sip:CPMSERVER@home.net>;tag=d3f423d
To: <sip:alice@home.net>;tag=8942
Call-ID: 3xtT2qw01
CSeq: 3 MESSAGE
Contact: <sip:CPMSERVER@home.net>
Content-Length: XXX Content-Type:application/TargetSessionTransferSessionListResponse+XML   :P10

TABLE 6-continued

```
<?xml version="1.0"?>
<TargetSessionTransferSessionListResponse version="1.0">
<SessionList>
      <Session>
         <SessionID></SessionID>
         <DeviceID></DeviceID>
         <Media-TypeList>
               <Media></Media>
               <Media></Media>
         </Media-TypeList>
      </Session>
      <Session>
         ...
      </Session>
</SessionList>
</TargetSessionTransferSessionListResponse>
```
:P11

Table 6 has a message format similar to that of Table 2, "TargetSessionTransferSessionListResponse" is written in Content-Type to indicate that this message is used by the call server to transmit a session list to device A-2 (See P10 in Table 6). In addition, information about a session list managed by the call server may be included in the Body (See P11 in Table 6).

Table 7 shows an example of an SIP SUBSCRIBE message format that device A-2 can use as a session request message in place of the SIP INFO message defined in Table 1.

TABLE 7

SUBSCRIBE sip:CPMSERVER@home.net sip/2.0
Via: SIP/2.0/UDP alice.cpm.home.net:5060
From: <sip:alice@home.net>;tag=8942
To: <sip:CPMSERVER@home.net>;tag=d3f423d
Call-ID: 3xtT2qw01
CSeq: 4 SUBSCRIBE
Event: SessionListRequest
Expires: 86400
Contact: <sip:alice@192.0.100.3>
Content-Length:XXX Content-Type:application/TargetSessionTransferSessionListResponse+XML :P12

```
<?xml version="1.0"?>
<TargetSessionTransferSessionListRequest; "1.0">
      <Device>
         <SIPURI></SIPURI>
      </Device>
</TargetSessionTransferSessionListRequest>
```
:P13

Like in the INFO message of Table 1, "TargetSessionTransferSessionListRequest" is written in Content-Type to indicate that the SIP message is used by device A-2, which requests a session list (See P12 in Table 7). Additionally, device information for which device A-2 requests the call server may be included in the Body (See P13 in Table 7).

Table 8 shows an example of a NOTIFY message format, which is a session list response of the call server corresponding to Table 7.

TABLE 8

NOTIFY sip:alice@home.net sip/2.0

Via: SIP/2.0/UDP cpmserver@home.net:5060

From: <sip:CPMSERVER@home.net>;tag=d3f423d

To: <sip:alice@home.net>;tag=8942

Call-ID: 3xtT2qw01

CSeq: 20 NOTIFY

Event: SessionListRequest

Expires: 86400

Contact: <sip:CPMSERVER@home.net>

Content-Length: XXX

Content-Type:application/TargetSessionTransferSessionListResponse+XML :P14

TABLE 8-continued

```
<?xml version="1.0"?>
<TargetSessionTransferSessionListResponse version="1.0">
<SessionList>
    <Session>
        <SessionID></SessionID>
        <DeviceID></DeviceID>
        <Media-TypeList>
            <Media></Media>
            <Media></Media>
        </Media-TypeList>
    </Session>
    <Session>
    ...
    </Session>                                              :P15
</SessionList>
</TargetSessionTransferSessionListResponse>
```

Table 8 has a message format similar to that of Table 2, and "TargetSessionTransferSessionListResponse" is written in Content-Type to indicate that this message is used by the call server to transmit a session list to device A-2 (See P14 in Table 8). Additionally, information about a session list managed by the call server may be included in the Body (See P15 in Table 8). As is apparent from the foregoing description, the present invention provides seamless session transfer between devices based on temporary storage in a CPM system so as to enable the user not to notice the session transfer even during the session transfer operation, thereby improving quality of the communication. Additionally, the present invention provides target device-initiated seamless session transfer in a CPM system so that the device desired by the user may directly initiate session transfer and temporarily store the data received from the remote user during the session transfer process in the call server, thereby ensuring continuity of communication services and increasing user satisfaction.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for transferring a session between multiple devices by a target device, comprising:
   selecting, by the target device, a first session established between a source device and a remote device, and sending a session transfer request for the first session to a call server;
   establishing a second session with the call server after sending the session transfer request and before a completion of the session transfer;
   acquiring, from the call server, through the second session, temporarily stored data that has been transmitted from the remote device via the first session after the session transfer request is sent and a session history of the first session;
   sending a message indicating a completion for a reception of the temporarily stored data and the session history to the call server through the second session; and
   establishing a third session with the call server to transfer the first session to the target device.

2. The method of claim 1, further comprising:
   receiving, from the call server, a message instructing to acquire the temporarily stored data and the session history from message & media storage of the call server; and
   acquiring the session history comprises acquiring the session history from the message & media storage.

3. The method of claim 1, wherein selecting the first session between the source device and the remote device comprises:
   acquiring, by the target device, a device list by sending a request for the device list to a network;
   requesting a call server to establish a fourth session for acquiring a session list of a source device included in the acquired device list;
   acquiring the session list through the established fourth session;
   closing the established fourth session; and
   selecting the first session between the source device and the remote device from the acquired session list.

4. The method of claim 3, wherein the session list is acquired by using a session request message including information on the source device, the session list of which is requested, wherein the session request message has one of SIP INFO, SIP MESSAGE, and SIP SUBSCRIBE formats.

5. A method for transferring a session between multiple devices in a call server, comprising:
   receiving a session transfer request for a first session of a source device from a target device;
   beginning, upon receiving the session transfer request, temporary storage of data transmitted from a remote party device via the first session after receiving the session transfer request;
   establishing a second session with the target device after receiving the session transfer request and before a completion of the session transfer;
   if the of the second session is completed, ending the temporary storage of data and transmitting the temporarily stored data and a session history of the first session to the target device through the second session; and
   establishing a third session with the target device to transfer the first session to the target device upon receiving a message indicating a completion for a reception of the temporarily stored data and the session history from the target device.

6. The method of claim 5, wherein transmitting the session history of the first session to the target device comprises further transmitting the session history through the third session.

7. The method of claim 5, wherein transmitting the session history comprises transmitting a session history stored on the call server if the session history is stored on the call server.

8. The method of claim 7, wherein transmitting the session history further comprises transmitting the session history through the third session.

9. The method of claim 5, wherein transmitting the session history comprises:
   acquiring the session history of the first session from a message & media storage if the session history is stored in the message & media storage; and
   transmitting the acquired session history of the first session.

10. The method of claim 9, wherein transmitting the session history further comprises further transmitting the session history through the third session.

11. The method of claim 5, further comprising sending to the target device a message instructing the target device to acquire the session history of the first session from a message & media storage.

12. The method of claim 11, wherein sending a message instructing the target device to acquire a session history comprises using an SIP MESSAGE format including information about a location of the message & media storage, in which the session history is stored.

13. The method of claim 5, wherein receiving the session transfer request for the first session of the source device from the target device comprises:
   establishing a fourth session upon receiving a request for the fourth session for transmission of a session list of the source device from the target device, wherein the session list includes the first session;
   upon receiving a request for transmission of the session list from the target device, transmitting the session list of the source device to the target device through the established fourth session; and
   receiving, in response to the transmission of the session list, the session transfer request for the first session of the source device from the target device.

14. The method of claim 13, wherein transmitting the session list to the target device comprises using a response message including session list information of the source device managed by the call server, wherein the response message has one of SIP INFO, SIP MESSAGE, and SIP SUBSCRIBE formats.

* * * * *